April 15, 1941.   L. KOZMA   2,238,223
AUTOMATIC HUNTING CIRCUIT
Filed Aug. 18, 1938   21 Sheets-Sheet 1
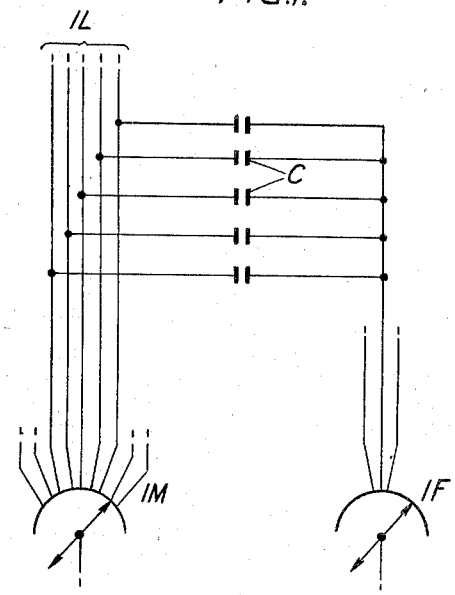
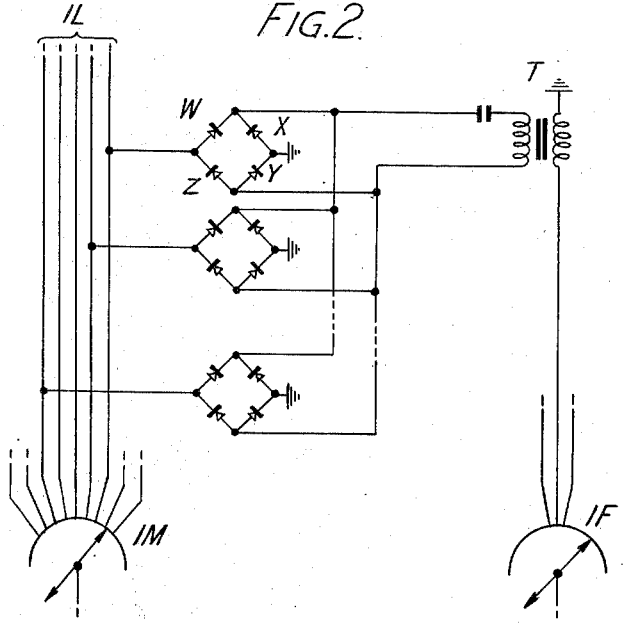
INVENTOR
L. KOZMA
BY
ATTORNEY April 15, 1941.  L. KOZMA  2,238,223
AUTOMATIC HUNTING CIRCUIT
Filed Aug. 18, 1938   21 Sheets-Sheet 5

INVENTOR
L. KOZMA
BY
ATTORNEY

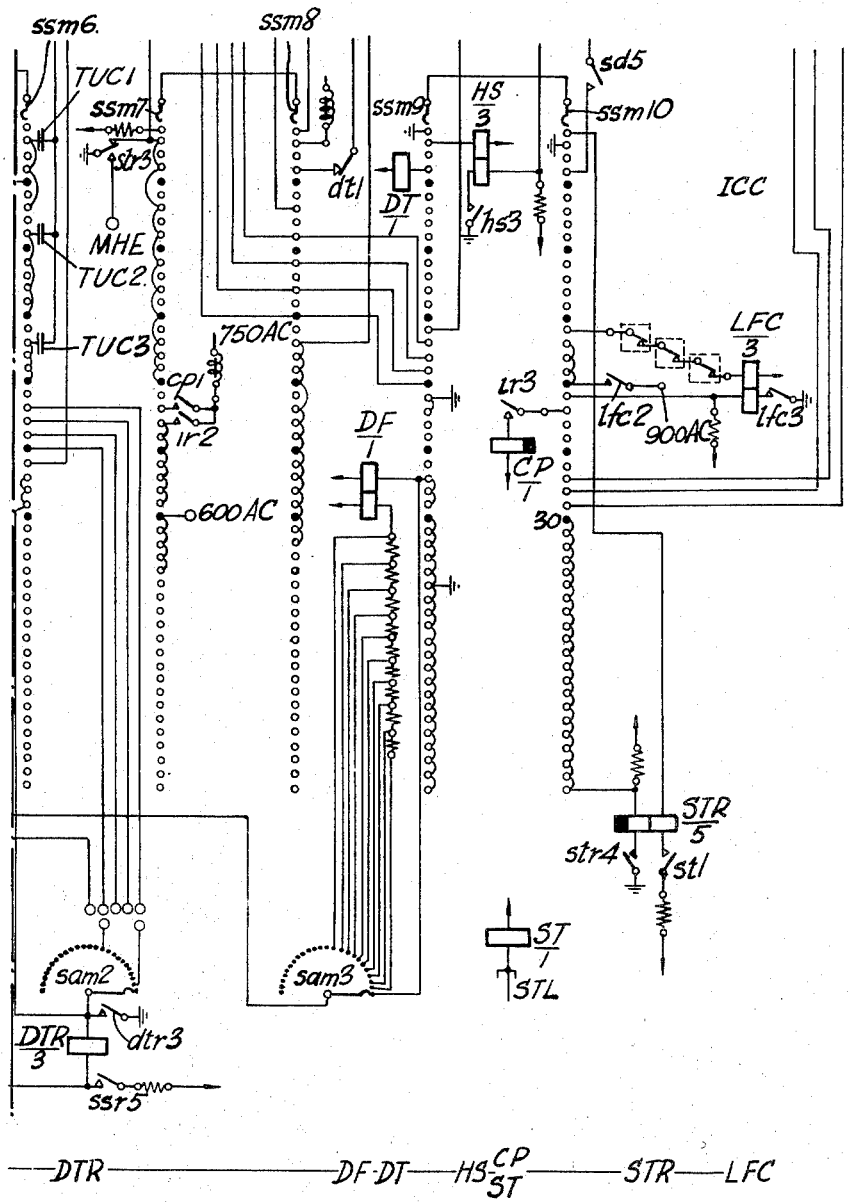

April 15, 1941.　　　L. KOZMA　　　2,238,223
AUTOMATIC HUNTING CIRCUIT
Filed Aug. 18, 1938　　　21 Sheets-Sheet 15

INVENTOR
L. KOZMA
BY
ATTORNEY

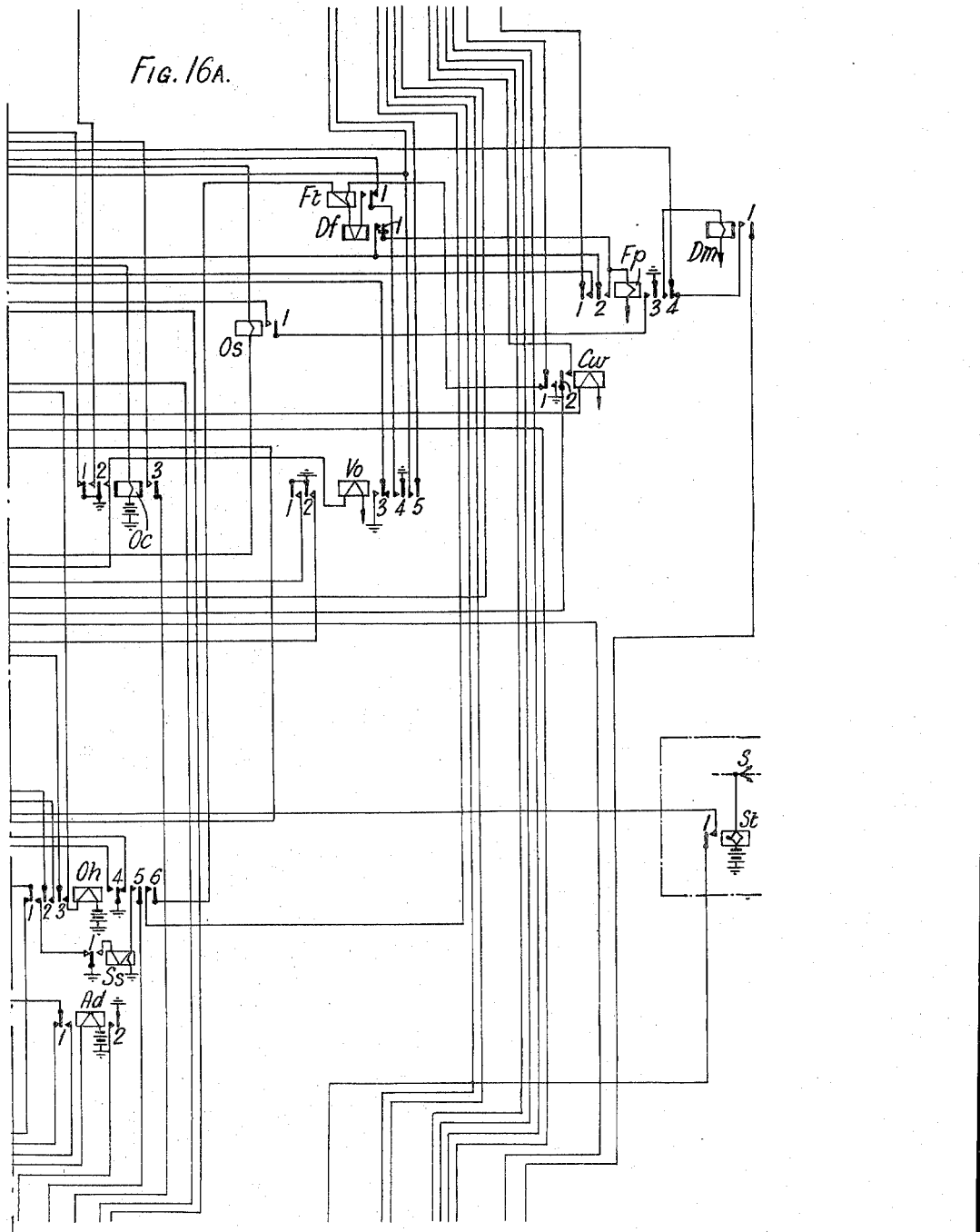

Patented Apr. 15, 1941

2,238,223

UNITED STATES PATENT OFFICE 2,238,223

AUTOMATIC HUNTING CIRCUIT

Ladislas Kozma, Antwerp, Belgium, assignor to International Standard Electric Corporation, New York, N. Y.

Application August 18, 1938, Serial No. 225,562
In Great Britain August 21, 1937

23 Claims. (Cl. 179—18)

This invention relates to automatic hunting switch or like circuit arrangements, for use for instance in telecommunication exchange systems, comprising groups of marking wires to which alternating current marking potential is to be connected for controlling the setting of such switches or the like.

The objects of the invention are to provide improved marking arrangements whereby commoned marking wires can be segregated from one another, and to use switches normally used for other purposes, for instance, final selector switches for making connection under control of marking current to lines connected to the switches for the purpose of identifying the lines so as to economise in the apparatus required for identification.

According to one feature of the invention marking wires are individually connected to marking terminals of a set of switches or the like and are also connected through individual segregating devices to common points, at which said wires are connected together in groups so that the potential on any one wire of a group can be used for a further control purpose, said segregating devices allowing alternating current to pass for said further control purpose, but preventing alternating current passing from one individual wire to another through their segregating devices.

Another feature of the invention comprises telecommunication exchange equipment comprising subscriber identification equipment characterised in this that conversational or other switches, which are normally used for other purposes and to the banks of which subscriber lines are connected, are used for making connection to a line to be identified under control of the subscriber identification equipment of which said switches therefore form part.

It is well-known that wiper-switches can be replaced by relay groups, and by cross-bar types of switching and selecting devices. The term "switch or the like" used in this specification is to be interpreted as covering such alternatives.

The invention will be clearly understood from the following description of two embodiments of the invention shown in the accompanying drawings in which:

Fig. 1 shows schematically a marking multiple provided with condensers for segregating the individual wires;

Fig. 2 shows a marking multiple with bridge rectifiers segregating the individual wires;

Figure 3:
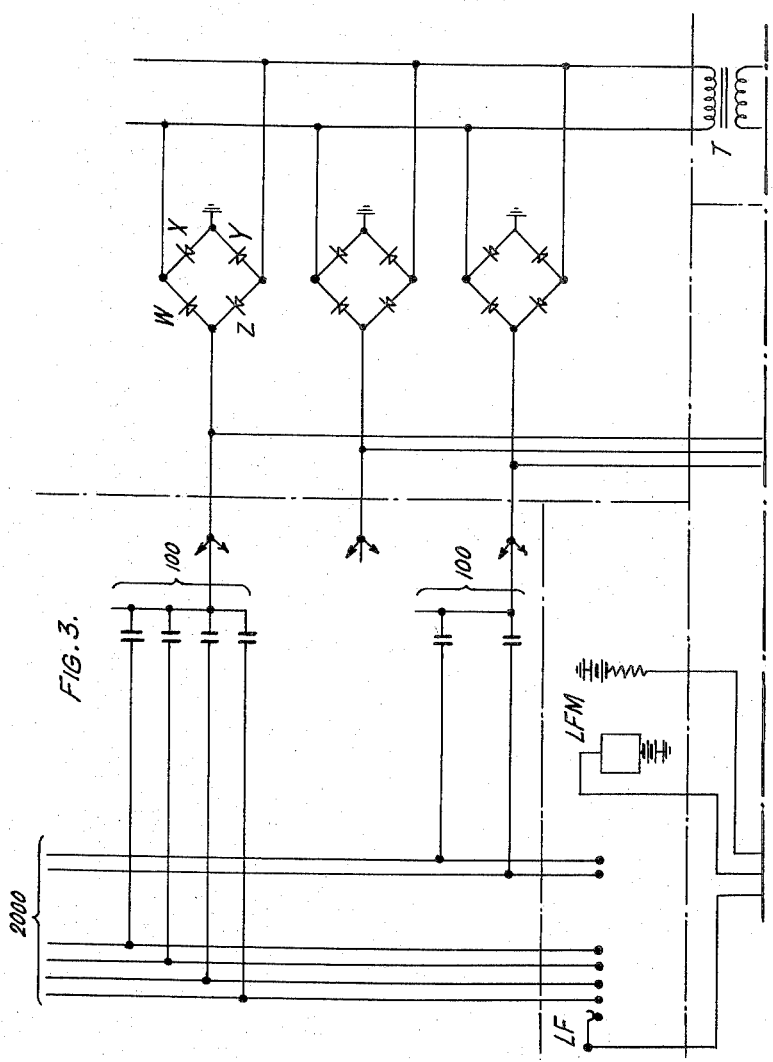
Figure 3A:
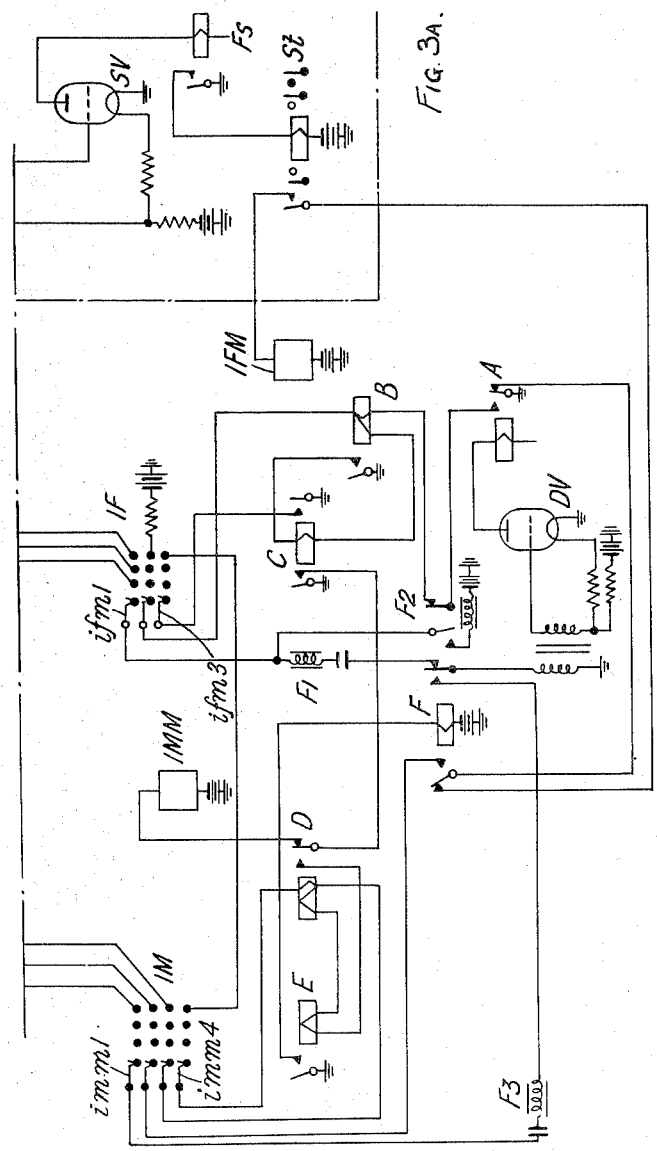
Figure 5:
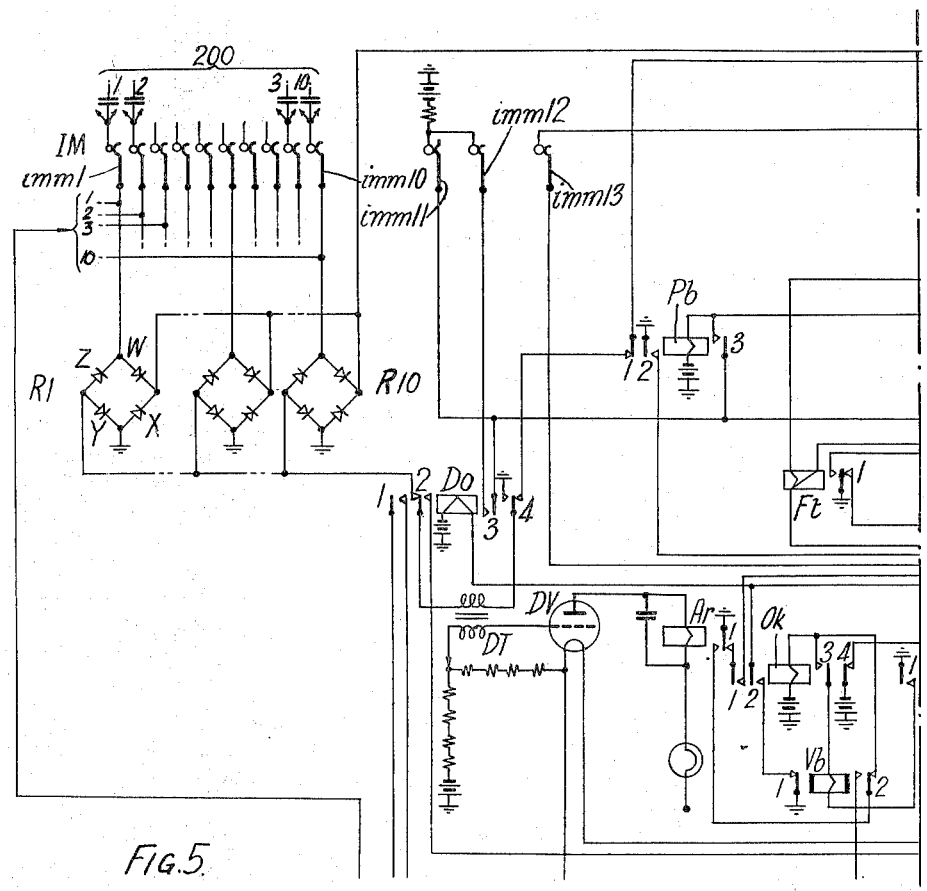
Figure 5A:
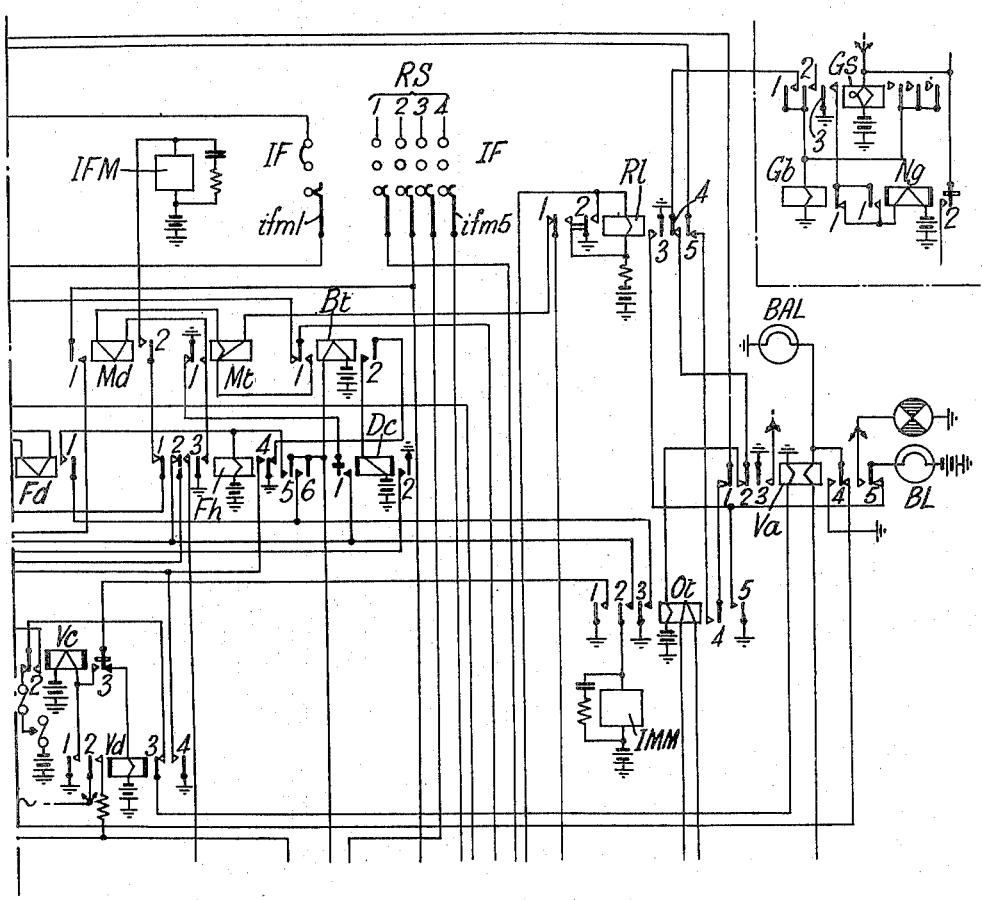
Figure 6:
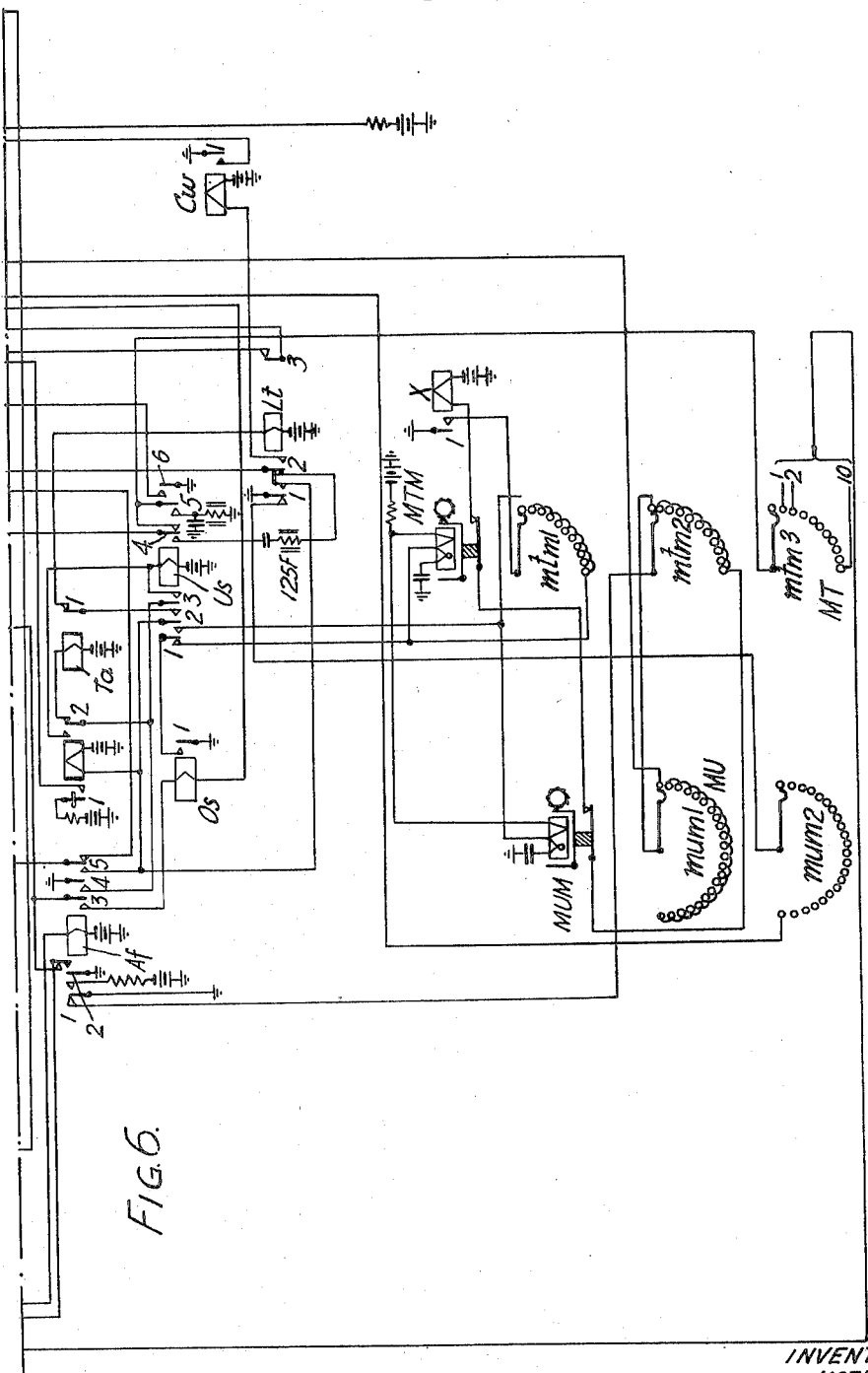
Figure 7:
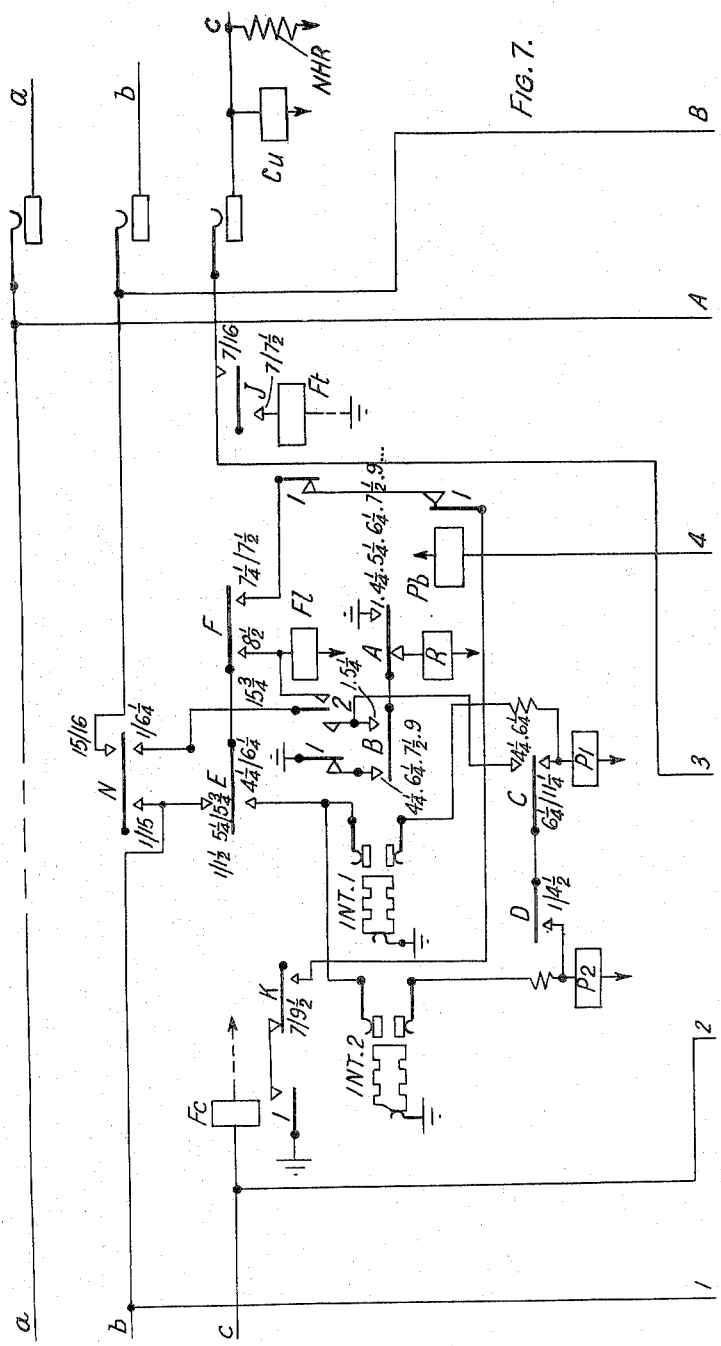
Figures 8, 9:
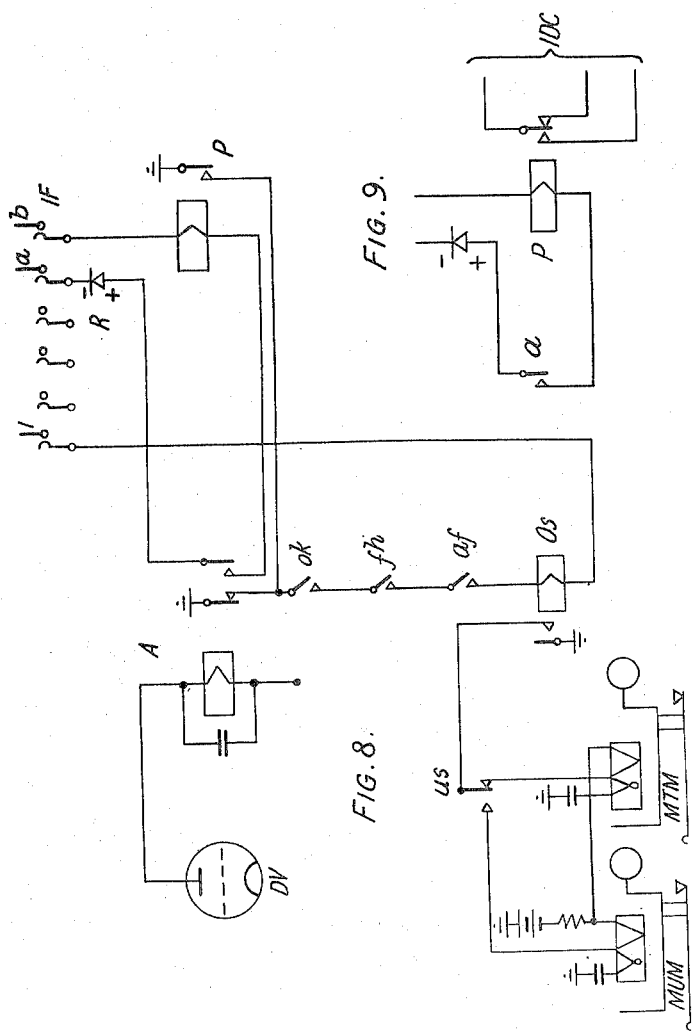
Figure 10:
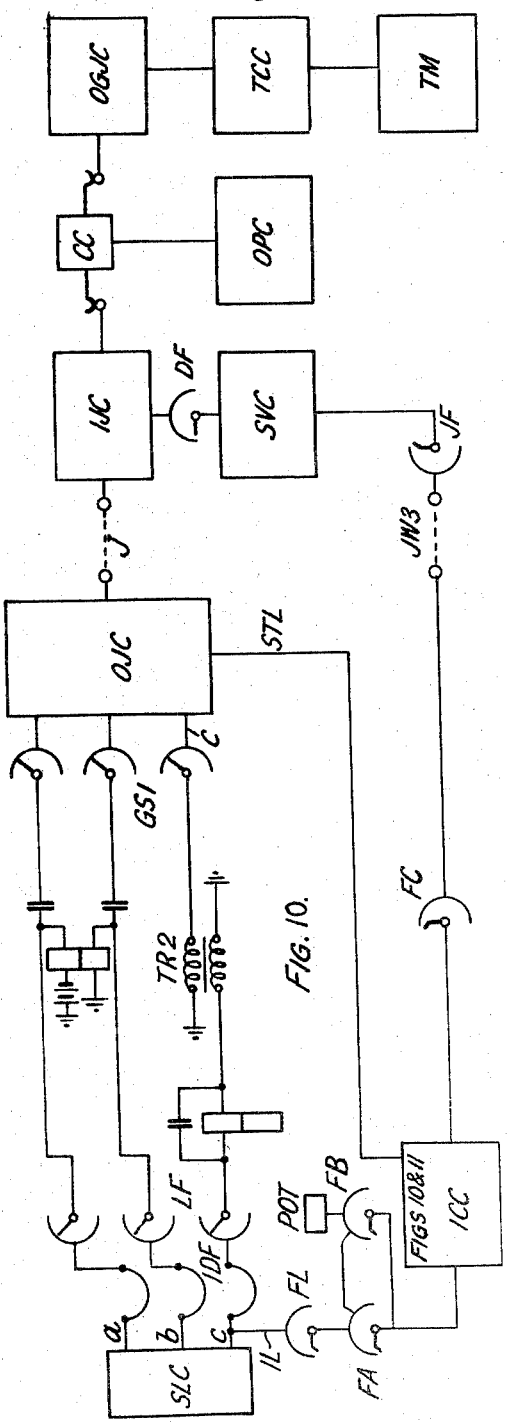
Figure 11:
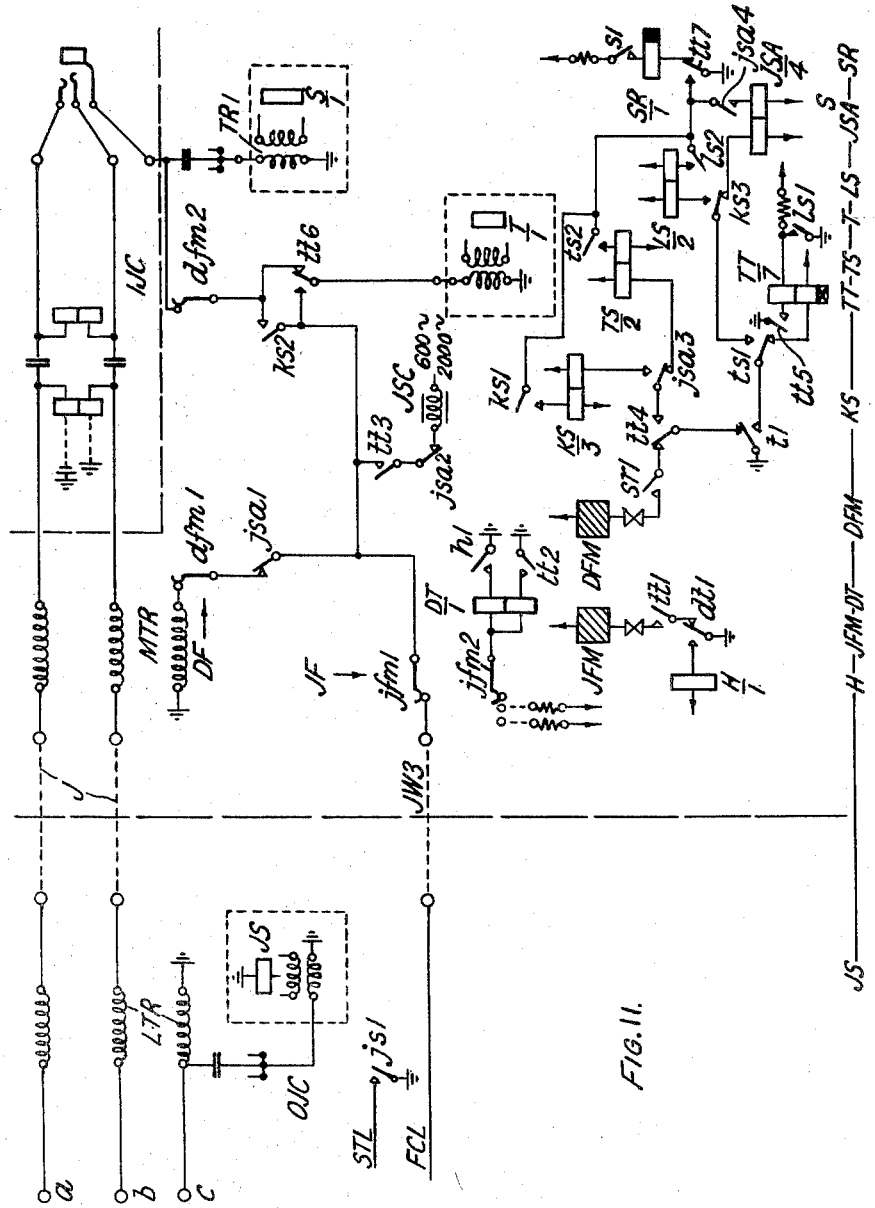
Figure 12:
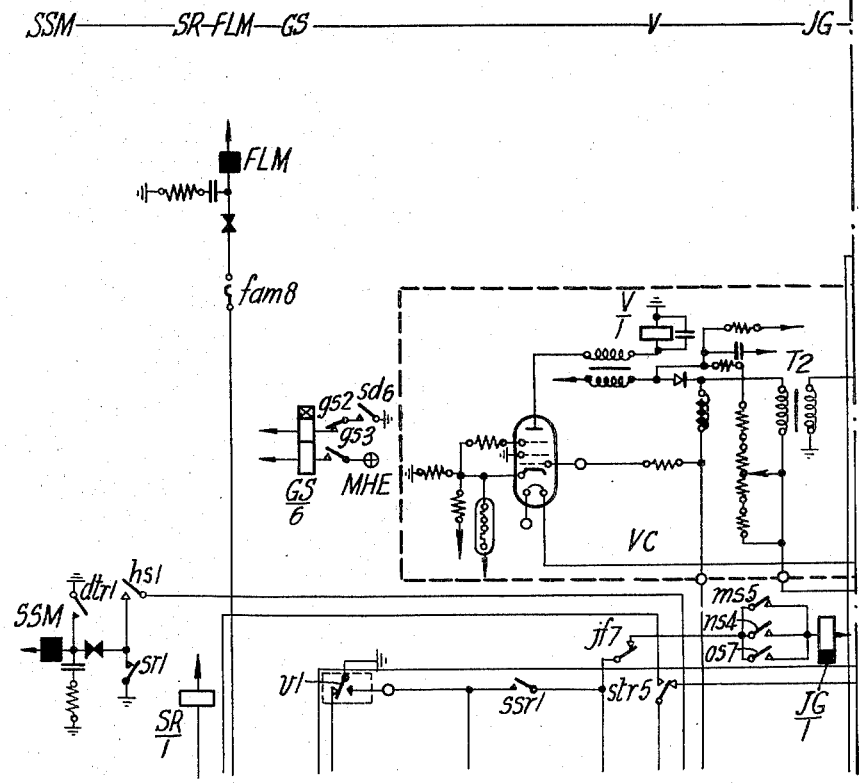
Figure 12A:
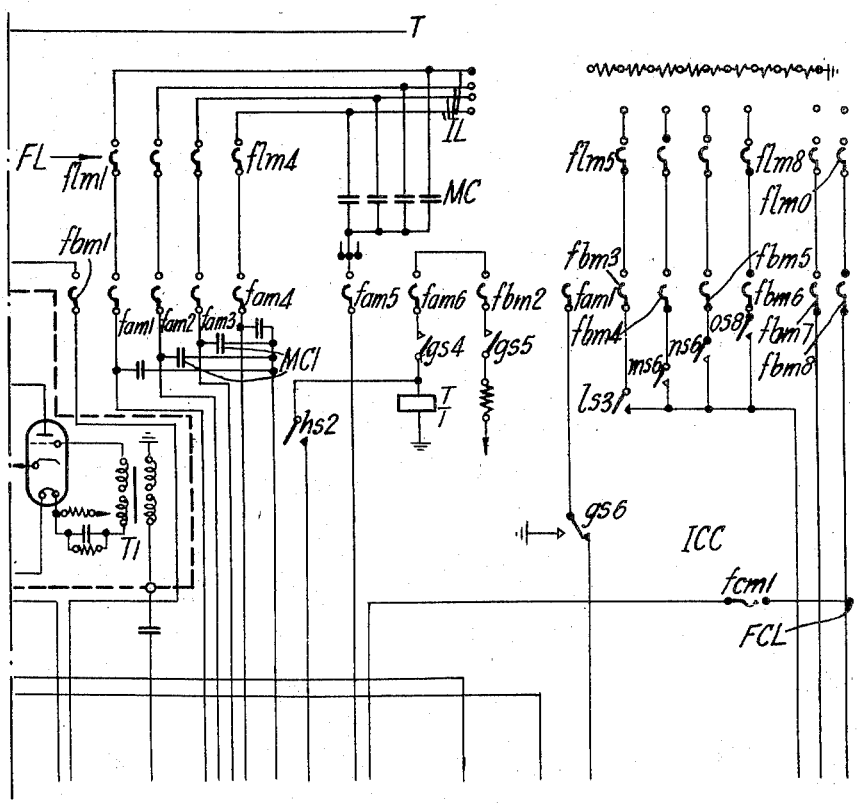
Figure 14:
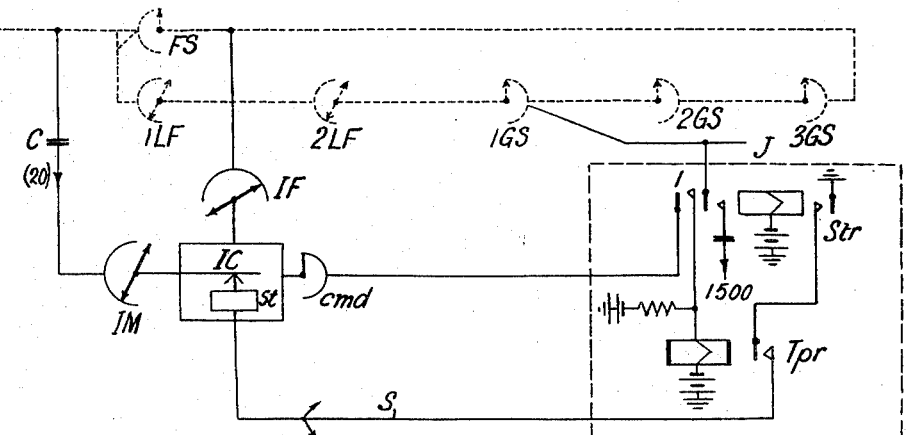
Figure 4:
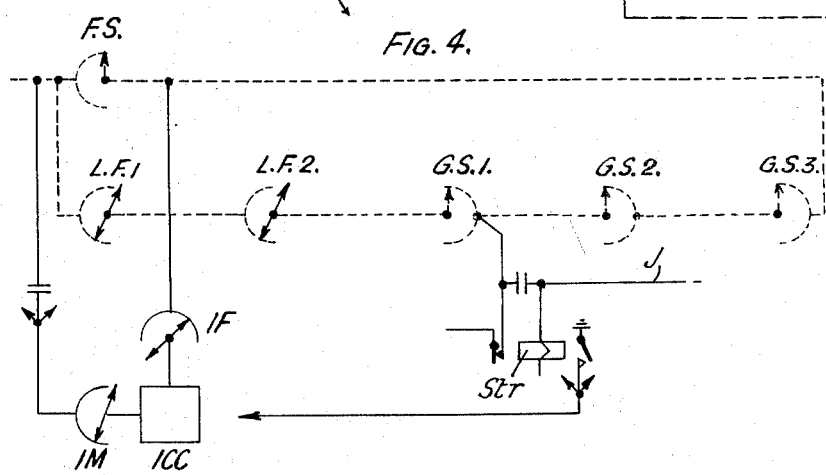
Figure 15:
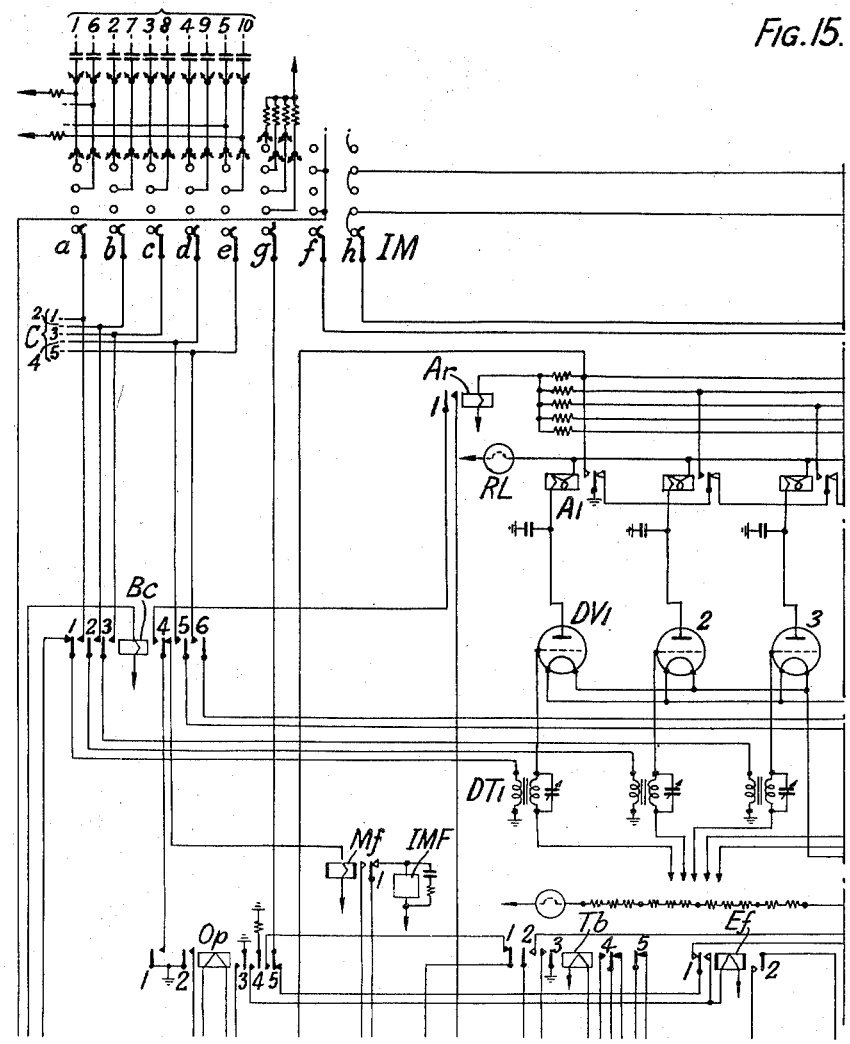
Figure 15A:
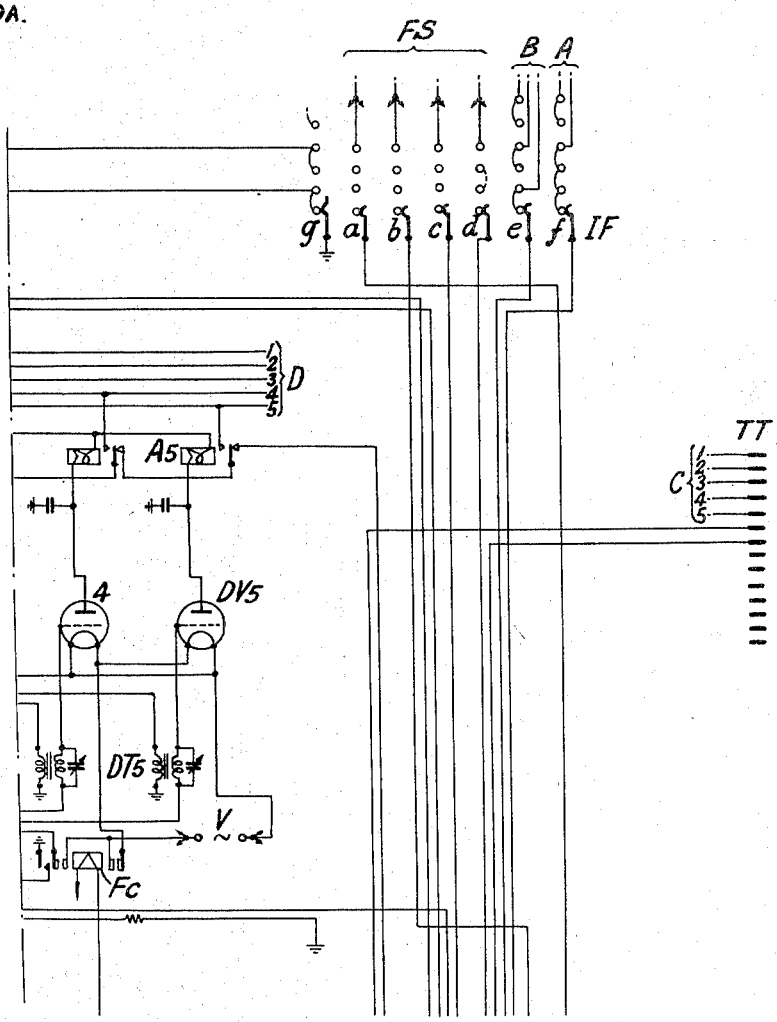
Figure 16:
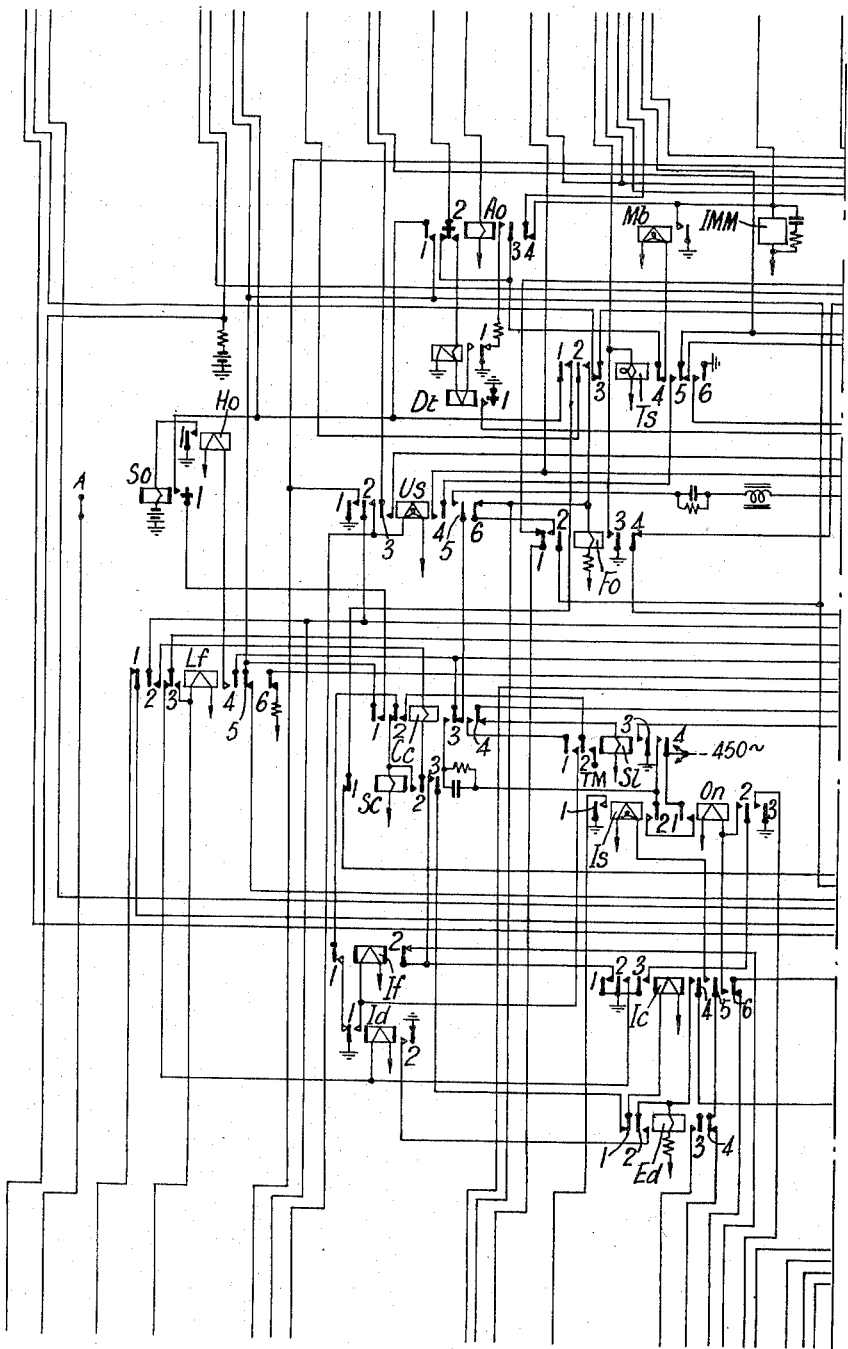
Figure 17:
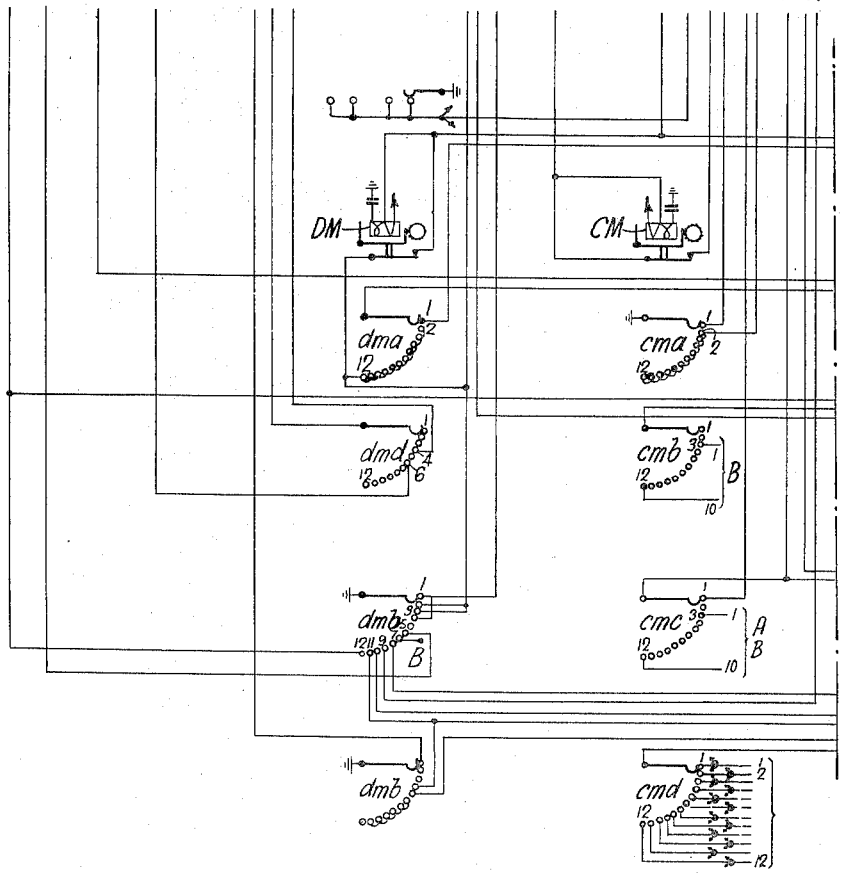
Figure 17A:
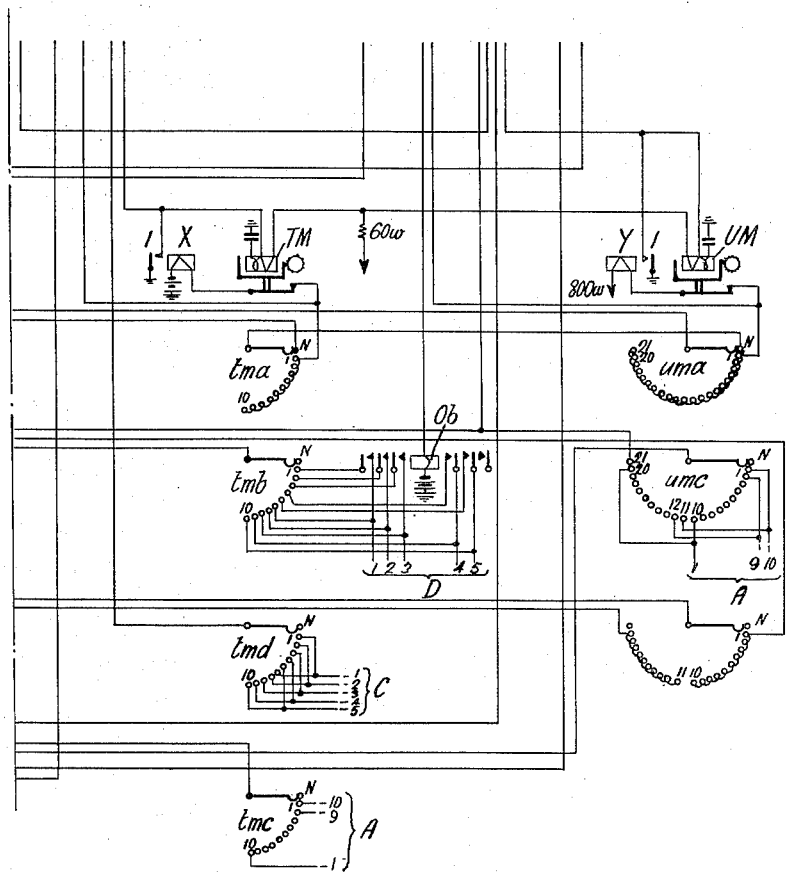

Figs. 3 and 3A when placed one above the other show schematically a telephone subscriber identifying equipment comprising two stages of identifying switches marked by marking wires multipled in two stages at which segregating condensers and segregating bridge rectifiers respectively are provided;

Fig. 4 shows schematically an interexchange connection in the rotary system provided with calling party identification equipment for automatic ticketing purposes;

Figs. 5, 5A, and 6 should be placed together with Fig. 5A to the right of Fig. 5, and Fig. 6 below both Figs. 5 and 5A; when so placed these three figures show the complete identification equipment indicated schematically in Fig. 4;

Fig. 7 shows sufficient of the circuit of a rotary final selector used for the second stage of calling party identification to illustrate the invention;

Figs. 8 and 9 show modifications of Figs. 5 and 6 for dealing with party lines;

Fig. 10 shows schematically a toll connection in the British Post Office system modified to provide calling party identification and automatic ticketing;

Fig. 11 shows sufficient of the inter-exchange signalling circuits to illustrate the signalling equipment for automatic ticketing purposes; while Figs. 12, 12A, 13 and 13A should be placed together with Fig. 12A to the right of Fig. 12, Fig. 13 below Fig. 12, and Fig. 13A to the right of Fig. 13 and below Fig. 12; when so placed these four figures show the complete calling party identification equipment indicated in Fig. 10;

Fig. 14 shows a schematic exchange layout arranged for calling party identification by means of a single marking frequency;

Figs. 15, 15A, 16, 16A, 17, and 17A should be placed together with Figs. 15, 16 and 17 in a vertical column in the order named, and Figs. 15A, 16A and 17A likewise in a vertical column in the order named, the latter three figures being respectively to the right of Figs. 15, 16 and 17; when so placed these six figures show the identification circuit for the exchange shown in Fig. 14.

The main problem of identification is to attach one identification circuit of a group to a certain individual wire which is marked by the presence of a calling tone. For economical considerations, the number of individual wires to which one group of control circuits must have access is higher than the capacity of one switching stage. If, for example, a group of three identification control circuits suffices for the identification of 2,000 subscribers, then two successive switching stages are required by the use of 100-point finders. The first problem to be solved, therefore, is to group the individual wires in a series of common points, which can be tested over by the finders of the first switching stage. The second problem is to obtain a starting indication, which means that the calling tone reaching one of the common points mentioned above must be conducted to a common starting valve, in order to energise the starting circuit of the identification control circuits, thereby initiating the hunting of the finders of the first switching stage.

The above two problems are solved by reduction multiples. Fig. 1 shows a condenser multiple, and Fig. 2 a rectifier multiple. Fig. 3 shows the adaptation of both multiples to the identification system proposed for universal use.

The reduction multiple, to obtain the common points for the first testing, must fulfil the following four conditions:

1. The individual wires, on which certain D. C. conditions are imposed for other purposes, must remain isolated one from the other at least as regards direct current.

2. The multiple must provide a passage for the calling tone from the individual wires to the common points for the testing of the first stage, or from the testing points for the second stage to the common start circuit.

3. It must be so arranged that the individual identification wires remain isolated one from the other for testing on the second stage, or that the commoned identification points for the first stage remain isolated from one another for testing at the first stage.

4. It must be built up of cheap elements, since one is required for each identification wire, or for each first stage group wire.

An arrangement satisfying the above four conditions is shown in Fig. 1. The multiple is built up of small condensers C of $\frac{1}{50}$ mf. capacity. The equipment calling for identification sends simultaneously two different calling tones: one of high frequency, e. g. 2,000 cycles, and the other of low frequency, e. g. 125 cycles over the individual line IL to be identified. The high frequency tone, which can easily pass through the small condenser, is used for testing by the finders IF of the first stage, whereas the low frequency tone, to which the small condenser offers a high resistance, is used for testing by the finders IM of the second stage. The 2,000 cycle current passes the condensers, but the 125 cycle current cannot pass from one wire IL to the others.

Another reduction multiple is shown in Fig. 2. The elements of this multiple are bridge rectifiers W, X, Y, Z, connected as shown on the drawing. When calling tone of any frequency appears on one individual wire IL the positive half cycles pass through one element W of the rectifier bridge belonging to this wire and the negative half cycles pass through element Z of the bridge rectifier. The tone then finds all other rectifiers connected in opposition, and therefore has to pass over the common transformer T. Behind the transformer, the circuit of the tone is connected over all rectifier elements Y in parallel to ground in the case of positive half-cycles of tone and over elements X in parallel in the case of negative half cycles. In this way, the level of the tone drops in the transformer substantially to zero, and cannot return to the other individual wires, which also have the zero level from an A. C. point of view. The wires can therefore be tested individually by the finders IM of the second stage. The finders IF of the first stage test the secondary winding of the common transformer T.

The two multiples described above are both employed in the universal identification system represented by Fig. 3. For the first multiple, i. e. to obtain the common points for the first testing, the condenser scheme is superior to the rectifier scheme. The rectifiers opposed to the D. C. voltage of the individual wires used for identification would prove too expensive, and would not be perfectly safe as regards D. C. isolation of the individual wires. The condenser scheme has therefore been adopted for the first multiple.

As regards the second multiple, required for starting indication, for this purpose the rectifier multiple has provided its adaptability. The D. C. potential of the individual wires is kept off by the condensers, and the rectifiers may therefore be of small size. The advantage of the rectifier scheme in this place is that it does not require the use of an additional frequency, which is in any case not available on the common points.

Below is given a short description of the operation of the universal identification system, Fig. 3. The circuit indicates an arrangement for 2,000 lines, but it is evident that, by changing the various figures, the size of the groups can be varied as required by local conditions.

When calling tone of 125 cycles superimposed by 2,000 cycles, is connected to one of the individual wires, the starting circuit is energised by the 2,000 cycle tone, which passes through the corresponding condenser rectifiers W and Z of the corresponding bridge, winding of T, rectifiers Y and X to earth in the manner already described above. Relay Fs connected into the plate circuit of the starting valve SV operates and energises St. Via the front contacts of St the finders IF of all free connecting circuits start to rotate, and one of them picks up the high frequency calling tone when it reaches the common point belonging to the individual wire which is calling. The driving circuit of IF is controlled at the back contact of relay A, which is the plate relay of the tone detector valve DV tuned for 2,000 cycles by a 2,000 cycle filter FI. Upon the operation of A, a double test is carried out by relays B and C, on a D. C. basis, in order to ensure that only one identification circuit is attached to the calling tone. The operation of C indicates a successful test.

Relay C closes the circuit of the finder IM, which now starts to hunt for a free identification finder LF which has access to the group of 100 individual wires corresponding to the common point found by IF. The test circuit for stopping IM, therefore, is controlled by the position of IF. When IM reaches the wanted free test potential, D operates; battery $imm3$, D, $imm4$, $ifm3$, front contacts of C; and IM stops. A double test ensures that only one control circuit engages the same finder. The operation of E indicates a successful test. Relay E energises F, which now connects the tone detector circuit to the brush of the identification finder LF via a 125 cycle filter F3. The identification finder LF is driven from the control circuit by the ground on the back contact of relay A which was released by F. When relay A again operates, the finder LF is stopped on the individual wire of the calling subscriber to be identified, and the sending of the required number as determined by the position in which LF and IF have stopped, may start.

During the hunting of LF, and afterwards, whilst sending takes place on an individual wire, the corresponding common point is grounded from the control circuit by a filter F2 tuned to the low frequency sending tone. This filter will render the condenser multiple completely free of interference, for low frequency tones, but will not influence the 2,000 cycle calling tone, which can therefore originate a new call from another wire at any moment.

Referring now to Figs. 4, 5 and 6 all identification control circuits form one group, and are started in subgroups. The starting signal from the central exchange at which the ticketing equipment is provided is passed over the junction J on a D. C. basis. A starting relay Str in the relay group of the outgoing junction circuit in the originating exchange operates, and, besides energising the common starting circuit, it connects to the "c" terminal of the first group selector a 125 cycle calling tone superimposed by a 2,000 cycle tone.

The calling tones pass through the cord and line finder circuits GSI, LF2, LFI, Fig. 4, and reach the "c" wire of the subscriber's line circuit.

The condenser multiple is built up of boxes, each containing 20 condenser elements of 1/50 mf. These boxes are equipped near the final selectors, or near to another place where the "c" wires of the subscribers' line circuits are available in numerical order. One box will be connected to the 20 "c" wires appearing on the same level of a group of final selectors. In a 10,000 line exchange, 500 such boxes will be provided.

The 20 condensers of a box are commoned on the other side, and one wire per box is connected to the arcs of the connecting finders of the identification control circuits IM. These finders, therefore, have to hunt over 500 terminals. The 500 wires leading from the condenser multiple are connected to the arcs of IM in such a way that the 10 wires of the same group of final selectors are connected to the same position of IM, in 10 different levels of a single-motion switch. Each position of IM, therefore, represents one group of final selectors, and a 50-point finder is adequate for 10,000 lines.

The identification control circuits test simultaneously the 10 levels of IM. This is achieved either by providing a testing valve per brush, or by a rectifier scheme, as shown in Fig. 5.

The starting impulse from the junction start relay Str, Fig. 4, energises relay Gs, Fig. 5, which in turn energises Gb in series with relay Ot of an identification control circuit of the group controlled by a relay Gb. If all the circuits of this group were busy, relay Ng would be operated to extend the start circuit to another group of identification control circuits. Vd now operates via vc3 and ot1 and causes Vc and Do to energise. The circuit of Vd is opened and it releases slowly, 2,000 cycle is connected during the time Vd is energised via vd2, do2, primary of transformer DT, do4, to earth. The current induced in the secondary of DT causes anode current to flow in valve VD if the valve is functioning and relay Ar energises. Relay Ok then operates via vb2, ar1. Vc has locked via vc3, ot1 and Ok locks via ok3, winding of Vb to vc1. Vb operates.

It will be noted that the circuit via Vd was opened when Vc operated and a test of the valve therefore takes place during the slow release time of Vd. If the valve is defective and therefore Ar and Ok do not energise, Va will energise via back contact vd3, when Vd releases, front contact vc2, to back contact ok4. The opening of contacts va2 would release relay Ct and thereby release the control circuit. Relay Va will lock up over its right-hand winding and flash lamp BL.

Assuming that the valve is functioning correctly, when Vd releases, Ar and Do release.

Magnet IMM now operates via ot2, fh2, ok1, ar1, and switch IM hunts for the group of lines comprising the calling subscriber. When the 200-line group is found high frequency signal current via the third wire of the subscriber line and the condenser connected thereto passes via the wiper of switch IM to which the group of twenty subscribers' lines including the calling subscriber's line are connected, rectifiers W and Z of a bridge rectifier, e. g. R1, va1, ot4, r15, pb1, do4, primary of DT, do2, rectifier Y and X to earth. The 2,000 cycle current induced in the secondary of DT renders valve DV conducting and relay Ar operates. Earth via front contacts of ar1 and vb2 passes via back contacts of af5 to operate relay Bt. A D. C. test relay Mt is now connected to test for double connections; earth af1, mtm2, mum1, rl1, high resistance winding of Mt, bt1, lt3, imm11 to test battery. If no other identification control circuit has stopped on the same outlet Mt will operate and lock over its low resistance winding in series with Md which also energises.

Relay Dc was energised when Bt operated via bt2, fh4.

If due to a double test, Mt does not energise, magnet IMM reoperates via ot2, dc1, mt1, and the finder IM resumes its search. Assuming that Mt and Md operate, the low resistance ground via Md, Mt on wiper imm11 busies the selected outlet of the IM switches.

When Md energises, magnet IFM is operated via md2, fh1, ft1 and IF hunts for an idle final selector in the group marked by the position of IM. When a selector is found Ft energises; earth, dc2, imm13, ifm1, Ft, md1, ifm3, and wire 2 to idle battery potential on the final selector (FS) c wire. The double test is performed by Fd and Ft and if IF is the only switch testing the final selector FS, Fd also operates followed by Fh and Do. Contacts fh4 open the circuit of Dc which releases slowly.

Relay Ar which has been energised by the 2,000 cycle current via IM is released by the operation of Do and Af energises via do1, af2, fh2, ok1, ar1. Af locks via do1, af2 and energises Ta.

A fundamental circuit is now completed; earth, ar1, ok1, fh2, af3, Os, ifm2, wire 1, b wire of final selector FS sequence switch-cams E, F Fig. 7, relay Fl of the final selector. Relays Os, Fl energise. Earth via os1, us1, energises magnet MTM of the 11-point digit storage switch MT.

The operation of F1 in FS Fig. 7 connects earth via fl1, and cams B, A to magnet R which steps the sequence switch to position 4¼. Earth via fl1, and cams C, D now causes the trip spindle P2 to rotate to position 4¼ and send back revertive impulses by means of INTZ over the fundamental circuit, in response to each of which Os is released to step switch MT.

Earth via do4, primary of DT, do2, us4, mtm3 is connected in turn to wires 1 . . . 10 connecting the bank of mtm3 to wipers imm1 ... imm10. When the imm wiper to which 2,000 cycle potential is connected is reached, relay Ar reoperates, opening the fundamental circuit to stop FS and MT. Relay It now energises via *af*5, *vh*2, *ar*1, followed by Us via *it*2, *af*4. The release of Fl, Fig. 7 closes another circuit for magnet R and the sequence switch advances to position 5¼.

Contacts *us*4 open the circuit of Ar which releases and again closes the fundamental circuit. Us locks via *us*3, *af*4, and It, is released. The circuit of the primary winding of DT now passes via *do*2, *us*4 operated, 125 cycle filter, *lt*2, wiper *ifm*4, wire 3 to the final selector test wiper.

The sequence switch, Fig. 7 is now in the position for units selection. The reoperation of Fl on the reclosure of the fundamental circuit again connects earth via *fl*1, cams B, A to R*l* so that the sequence switch steps to position 6¼. The brush carriage rotates P*l*, cam C, *ffl*1.

This time the revertive impulses are caused by INT1, Fig. 7, and they are repeated by Os via *os*1, *us*1 to magnet MUM of 22-point storage switch MU. When the brush carriage reaches the terminals to the c wire of which 125 cycle potential is connected, Ar is operated, whereupon Os and Fl in FS are released and the brush carriage stops. The marker MU has made the same number of steps as the brush carriage of the final selector FS. Relay It is reoperated and contacts *it*1 connect battery via *ifm*5 and lead 4 to operate a special relay in FS to suppress P. B. X hunting. The release of Fl, Fig. 7 has again connected earth via *fl*1, cams B and A to R and the sequence switch steps on.

The resistance NHR is only provided for last lines of P. B. X groups and for single lines. Normally this resistance in parallel to Co prevents Ft operating in position 7 of the sequence switch if the line on which FS is standing is busy. If the line found is a P. B. X line other than the last Ft energises and operates Fl in position 7¼ via cam F, back contacts *ft*1, *pb*1, cam K, *fc*1. R stops in position 7½ for P. B. X hunting. This circuit of Fl includes back contacts of Pb. The operation of Pb therefore prevents operation of Fl and therefore as in the case of single lines, earth via *fl*1 back, cams B, A steps R through position 7½ to busy position 9.

If the calling tone persists for sufficient time It will release slow-release relay Ta. This arrangement ensures that the brush carriage has stopped on a marked terminal, and has not been stopped by potential kicks produced by changes in the direct current conditions on a subscriber's c wire.

Earth via *ar*1, *vb*2, *af*5, *us*3, *ta*1 energises relay Lt.

The identification circuit has been held by the earth potentials supplied by contacts of Ot during the above operations.

During sending, earth, via a 125 cycle filter is connected via *lt*5, *mtm*3, *imm* wiper to the multiple point connection of the twenty marking wires including that of the calling line. This prevents low frequency interference between the individual marking wires, while allowing an identification circuit to deal with another connection in the group.

If a premature release had taken place, Ot would have released the circuit, unless there is another call at the same time.

If a premature release occurs while the final selector brush carriage is hunting, and the identification circuit is held by another call, FS will not find a marked outlet on the selected level and switch MU will take 21 steps. Relay R*l* is therefore energised via *mum*2, *lt*1. R*l* locks via *rl*2 and releases Ot and the other relays. Relay X operates via interrupters of MTM, MUM, *mtm*2, *af*1, and closes a circuit via *x*1, *mtm*1, for MTM. Relay X interacts with MTM and MT homes. Relay X then interacts with MUM and MU homes. Earth is then connected via *af*1, *mtm*2, *mum*1, *rl*1 to short circuit and release R*l*.

Assuming that the conversation continues, relay Cw energises via *lt*2, *ifm*4, lead 3, and the c wire of FS, in parallel with the calling subscriber's cut-off relay, and earth via *cw*1, holds Ot. If release takes place during transmission of the calling party's number, Cw and Ot will release, and the identification circuit will return to normal.

The various digits are determined in the following way and are transmitted in well-known manner. In a six-digit area, the first two digits are known from the office. These two invariable digits are sent in positions 1 and 2 of a sequence switch respectively.

The 1000's digit is determined by the position of IF, or, in other words, by the group to which the engaged final selector belongs. The 100's figure is a function of the position of IF and that of the marker MU. As known, one group of final selectors gives access to 200 subscribers (odd-even hundreds). In the case of even hundreds, MU has received maximum 10 impulses only, during the units selection, whereas in case of an odd hundreds the final has sent 10 impulses more.

The 10's digit is indicated by the position of MT.

The units digit is sent under the control of MU.

When certain of the subscriber lines of an exchange serve more than one substation, special provision has to be made for identifying the calling party on such party lines. The provisions to be made for certain two-party line cases will be described.

There are a number of two-party line schemes in use in which the line has two appearances both in the line-finder banks and the final selector banks, one for each party. Nevertheless they all have to fulfill the fundamental requirement that when one of them is engaged on a call, the other line should appear busy. This is obtained in the easiest way by strapping together the two "c" terminals. If now the "c" wire is used for identification then the "c" wire test alone does not suffice to identify the calling party, since the identification switch can stop on either of the two "c" terminals. An additional check is therefore required over a separate wire, which has to prove the validity of the first "c" wire check.

If final selectors are used for identification, the additional check can be conveniently made over the talking wires. It is known that the subscriber sets of the two parties are connected to the "a" and "b" wires with opposite polarity, in order to obtain selective ringing by means of a similar reversal of the "a" and "b" wires on the final selector arcs. As a result of this, the feeding wires from the line finder side also have opposite polarity. It follows from the above that the identification final will have to stop on that "c" terminal which corresponds to the "a" and "b" terminals with the regular polarity (ground on "a" wire, battery on "b" wire).

Two cases are possible. The first is the normal case of two subscribers having consecutive numbers. The second case is that the two parties have two quite different directory numbers. They will be described with reference to Figs. 8 and 9.

In the former case the operation of the circuits will be as follows:

Relay Os Fig. 8 is operated in series with Fl in the final selector as previously described. Revertive impulses from the brush carriage of the final selector short circuit Os, which in this way advances switch MU by its magnet MUM step by step. When a "c" terminal is reached on which a calling tone is detected, relay A operates and connects P via the final selector to the "a" and "b" wires of the calling subscriber. If the wire "a" is positive against "b", the rectifier prevents relay P from operating, and the fundamental circuit becomes opened by A, so that Fl releases and the brush carriage stops. However, if the "a" wire is negative compared with "b" relay P operates before the short circuiting ground on Fl is removed, and the brush carriage has to rotate further. On the "c" terminal of the other party (which is the next one or may be any on the same level), A operates again and since the polarity is now the opposite of the first one, P does not operate and the brush carriage stops. The position of the marker MU, corresponding to the position of the brush carriage, determines the calling station.

It is evident that on an ordinary subscriber's line P will not operate, the "a" wire being always more positive than the "b" wire.

In the second case referred to above, i. e. when the two subscribers are connected to different levels of the same or of different final selectors, two common points will call for identification, and consequently two identification control circuits will be engaged. One will find the polarity of the talking wires correct and will achieve identification, whereas in the other circuit relay P will operate and the brush carriage will continue to rotate. After having made 21 steps, the control circuit will release in the manner described above.

In another type of two-party line, there is one position common to both subscribers on both line finder and final selector banks. On inward calls, the polarity of the talking wires is changed by the line relays, one being provided for each party. On outward calls the polarity is changed in the final selector by a relay under the control of the register. The two subscriber numbers differ only in the first digit; the last five digits are identical.

Fig. 9 shows the wiring of relay P in connection with this type of two-party line circuit. In principle the same check is made on the talking wires as before. The brush carriage of the final is always arrested by the operation of the valve relay A independent of relay P. Relay P determines which of the parties is the calling one, depending on the polarity of the talking wires, and changes accordingly the first digit to be sent to the printer via circuit IDC.

Referring now to Figs. 10 to 13 when a subscriber SUB initiates a toll call his line is automatically extended via a line-finder LF, a first code selector GSI and outgoing junction circuit OJC to a junction J to a toll exchange. The incoming junction circuit IJC signals the operator who extends the connection by a cord-circuit CC associated with her position equipment OPC to an outgoing junction circuit OGJC to which a ticketing control circuit TCC and a ticketing machine TM are automatically connected.

The operator transmits the wanted number communicated to her by the calling party and this number besides setting up the wanted connection, is recorded on the ticketing machine in known manner.

The ticket machine is now in a position to receive indications as to the cost of junction used. The ticketing control circuit TCC knows the junction used and appropriate pulses indicating shillings and pence are sent in to the machine. The facility is given to vary this cost according to the time of the day, that is as to whether it be full charge, intermediate charge or night charge. The control circuit now receives from the operator's position equipment OPC a signal representing either an ordinary call, personal call or transfer pay call. After recording this signal the ticketing machine is ready to record the calling party's number.

The ticketer control circuit TCC now sends back 600 cycle current over the third wire of the conversational trunk through CC to transformer TRI, Fig. 11, of valve signal receiving equipment in IJC. The receiving equipment is of known type and is indicated diagrammatically by transformer TRI and relay S in the valve anode circuit. Relay S responds to the 600 cycle signal and at sl operates SR which at sr2 closes a circuit for magnet DFM of switch DF. Switch DF looks for IJC and when it finds the marked outlet, relay T of a valve receiving circuit in the junction signalling circuit JSC energises in known manner. Relay T energises TT which stops DF. TT locks and switches T over to test wiper jfml of switch JF so that T releases. TT also releases SR.

Switch JF now hunts for a free signal wire JW3 to the local exchange; JFM, ttl, dtl. When a free JW3 wire is found DT operates and operates H. Earth via hl and low resistance winding of DT busies JW3 to other JF switches.

TT also connects 600 and 2000 cycle potential via jsa2, tt3, jsal, dfml to transformer MTR. Alternating current of the said frequencies is transmitted in simplex fashion over the junction J and is induced by transformer LTR in the local exchange c wire. 2000 cycle current operates JS in circuit OJC, Fig. 12.

Figure 13:
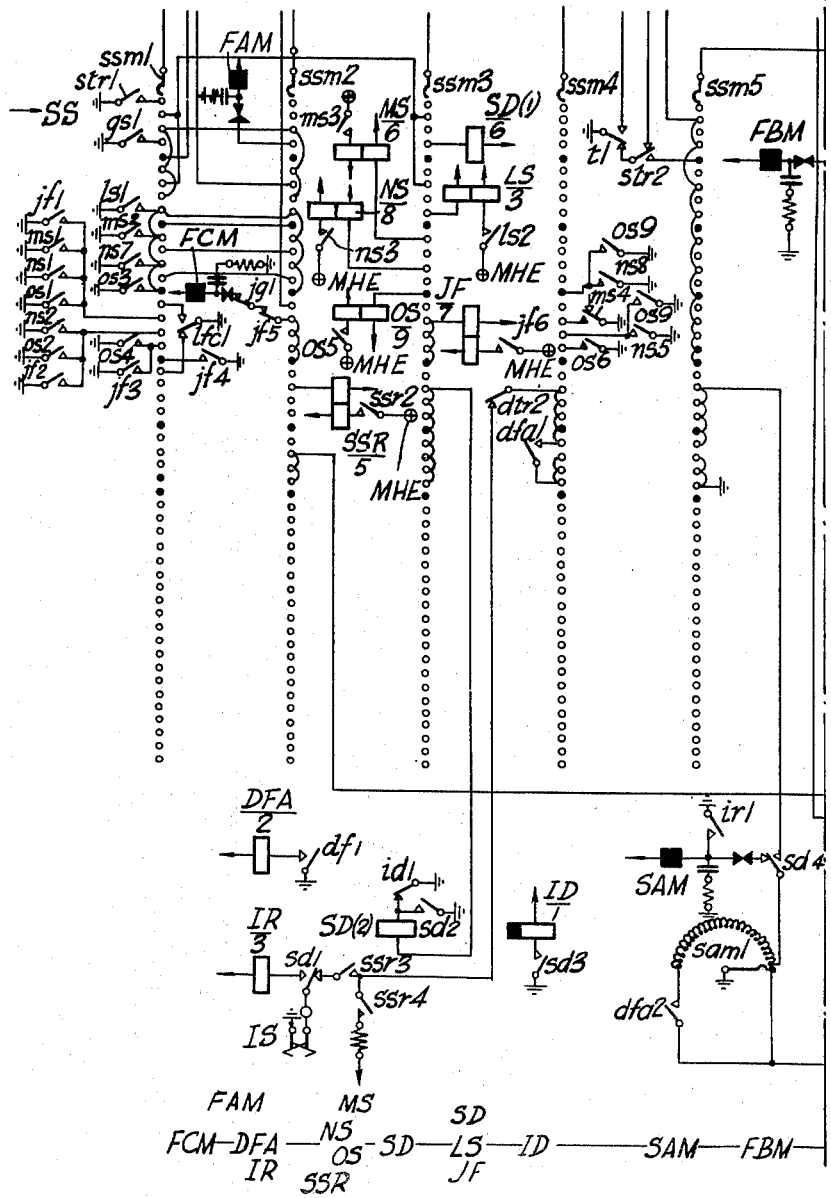

Contacts jsl connect earth potential to lead STL to operate relay ST, Fig. 13 in the identification control circuit ICC. Relay STR operates; stl, STR, ssm0, ssm9, earth. SR operates via ssml, strl and causes SSM to step switch SS to position 2. SR releases, but STR locks energised over its left hand winding.

Alternating current of suitable frequency is now connected via ssm8, ssm7, to the valve circuit VC which is of known type. If the valve circuit is in order, relay V operates and connects earth via vl, ssm3, ssml, to energise SR so that SS takes another step to position 3. The test alternating current is removed from VC, V releases and SR releases.

SR is reoperated via ssml, ssm2, vl, back, and SS steps to position 4. This ensures that relay V has released.

Magnet FAM is now connected via its interrupter, ssm2, vl, to earth and switch FA looks for the marking 2000 cycle potential. The 600 and 2000 cycle potential induced in wire c, Fig. 11, is induced by transformer TR2 in the local link circuit LF, GSI, Fig. 10 in the third wire connection to the calling subscriber's line.

To each third wire on the subscribers' side of the intermediate distributing frame IDF is connected a marking wire IL. These marking wires are each connected to an individual .005 microfarad condenser MC. The condensers MC are connected together in groups of two hundred and each group is multipled to a corresponding position in the bank of wiper *fam5* of switch FA.

Switches FA and FB are 8-level 50-point single-motion switches. Four wipers *fam1 ... fam4* give access to 50 groups of four wires each, each group being connected to four wipers *flm1 ... flm4* of a switch FL each of which gives access to fifty groups of four marking leads IL each. Thus FA has access to $50 \times 50 \times 4 = 10,000$ marking leads IL through the FL switches, and $200 \times 50 = 10,000$ leads IL through wiper *fam5*.

2000 cycle current can flow unimpeded from IL leads through the condensers MC, but the 600 cycle current cannot pass through two condensers MC in series from one lead IL to another. 2000 cycle current is therefore used to mark the groups of 200 lines in the bank of FA, while the 600 cycle current marks the individual IL lines in the banks of the FL switches.

When *fam5* reaches the outlet to which the line IL of the calling party is multipled, 2000 cycle current flows via *fam5, dtl1, ssm8, ssm7*, VC. Relay V energises and opens the circuit of FAM to stop FA. SD operates via *ssm3, v1*, and closes an energising circuit for slow-to-operate relay GS.

DT is connected via *ssm9, ssm0, sd5, gs6, fam7*, to make a direct current test of the selected outlet via *fam7*. If the selected outlet has no other FA standing on it, there is no potential on the bank contact of *fam7* so that DT does not operate and GS slowly energises. When GS operates it locks and energises SR via *ssm1*. SS takes a step to position 5 where SD, SR release. Earth via *gs6* busies the seized outlet, GS being locked via *gs3* to main hold earth MHE from *str3*.

If DT operates, the circuit for VC is opened at *dt1*, V and SD release, the energising circuit for GS is opened and FA steps on.

With SS in position 5, FB is stepped; FBM, *ssm6, ssm5, str2, t1*. When it reaches the outlet seized by FA, T operates via *gs4, fam6, fbm2, gs5*. Earth via *t1, str5, ssm1* operates SR to step SS to position 6. V now releases so that earth via *v1, ssm2, ssm1* operates SR again to step SS to position 7.

FL now hunts for the group of four leads IL including the marked lead; FLM, *fam8, ssm2, v1*. When the group is found, 2000 cycle current via one of wipers *flm1 ... flm4*, one of wipers *fam1 ... fam4*, one of another set of four .005, condensers MC1, *ssm8, ssm7*, VC, operates V both to stop FL, and to operate SR to step SS to position 8, in which V releases and again operates SR to step SS to position 9.

In positions 2, 4, 7, a tuning circuit for VC was completed via *ssm5, ssm6*, and tuning condenser TUC1 of suitable capacity to tune VC to respond to current of the test frequency and 2000 cycle marker frequency.

In positions 9, 11, 13 and 15 a tuning condenser TUC2 of different capacity is connected to VC to tune it to respond to 600 cycle marker current.

VC is now connected via *ssm7, ssm8, fam4, flm4*, to one of the selected IL lines.

If there is 600 cycle current on this line relay V will operate and energise LS via *ssm3*.

LS locks to the main hold earth MHE on *str3*, and operates SR to SS to position 10.

V releases and operates SR to step SS to position 11.

If V and LS do not operate in position 9, earth via the back of *v1* will step SS first to position 10 and then to position 11.

SS may reach position 11 therefore with LS either operated or not operated.

If LS is operated, showing that the marked lead IL has been found in position 9, earth via *ls1* front and *v1* back in turn step SS from position 11 to position 16.

If LS is not operated in position 11, VC is connected via *ssm7, ssm8, fam3, flm3* to the next lead IL. If this IL lead is the marked lead, MS will operate, lock and step SS to position 16. If the IL lead connected to *flm2* is the marked lead, NS will operate instead of LS or MS while if the IL lead connected to *flm1* is marked, OS alone will operate. In every case, SS is stepped to position 16.

The junction third wire JW3 seized by JF, Fig. 11, at the toll exchange is now to be selected, and, to prevent wrong selections, only one identification control circuit is allowed to hunt for a wire JW3 at a time.

For this purpose a relay LFC in each ICC is connected over a chain of back contacts of relays LFC of other identification circuits to contact 16 of *ssm0*.

If no other LFC is energised, LFC operates via *ssm0, ssm9, ssm2, v1* and locks. Earth via *ifc1, ssm1*, operates SR to step SS to position 17.

If LS is operated, SS stops in position 17. If MS is operated earth via *ms1* causes SS to step to position 18. If NS is operated SS steps to position 18 and position 19 in turn, while if OS is operated, SS steps to position 20. In stepping to the correct position, JG may be operated to prevent closure of the circuit of magnet FCM.

When finally on position 17, 18, 19 or 20 FCM operates via its interrupter, *jg1, jf5, ssm2, v1*, to look for 900 cycle current, VC being tuned at this time by condenser TUC3. The 900 cycle marking current is applied via lead 900 AC, *lfc2, ssm0, ssm9*, one of wipers *fam1 ... fam4*, one of wipers *flm1 ... flm4*, IL, IF, Fig. 10, TR2, GS1, wire c, LTR, Fig. 11, MTR, *djm1, jsa1, jfm1*, JW3, FCL. When FC finds the marked JW3, the 900 cycle current flows via *fcm1, ssm8, ssm7*, to VC. Relay V operates and energises JF which locks and stops switch FC. Contacts of JF now cause SR to operate in all positions of SS up to position 21 so that SS steps to position 22. In position 21 earth via *ssm9, ssm0* short-circuits and releases LFC.

Relay SSR now operates via *ssm1, v1* and locks. Battery via *ssr4, dtr2, ssm4, ssr1, ssm3*, SD (2), *id1* operates SD when short-circuiting earth via impulse springs IS, *sd1, ssr3* is removed by springs IS opening. SD removes the short-circuit at *sd1*, and locks via *sd2* while SS is in positions 22 ... 26 at least, energising ID.

Relay IR energises when springs IS next close and operates slow-release relay CP via *ir3, ssm0, ssm9*, while springs IS are closed. Contacts *ir1* energise magnet SAM which is released when springs IR reopen. Switch SA takes one step anti-clockwise and DTR energises; battery, *ssr3*, DTR, *sam2, ssm6, ssm5, sd4, sam1*, earth. DTR locks to *dtr3* and releases SD at *dtr2* so that IR is disconnected from IS.

While CP is energised, a cancel pulse of alternating current potential of 750 cycles is applied via lead 750 AC, *cp1, ssm7, ssm8, fcm1*, FCL, JW3, *jfm1, tt6* to operate relay T, Fig. 11. The valve circuit for T is arranged to change its tuning to respond to 750 cycle current instead of 600 cycle after receipt of the 600 cycle starting and marking pulse. Earth via *tl*, *tsl*, *ks3* operates JSA which locks via *jsa4*, *tt7*, removes the 600 and 2000 cycle potential from the junction at *jsa2*, and opens the marking circuit for JW3 at *jsa1*.

When CP has released, the cancel pulse is removed from FCL and T, Fig. 11, releases. Earth via *tl*, *tt4*, *jsa3* energises KS, which locks via *ks1*, *tt7*. JW3 is now connected via *jfm1*, *ks2*, *dfm2* to the sleeve wire of the cord circuit over which trains of digital impulses may be sent to the ticketing circuit. The valve circuit for T automatically changes its tuning after receipt of the 750 cycle pulse so as to respond only to 600 cycle current again.

The subscriber's number is sent to the ticketing circuit via JW3 in positions 23 ... 29 of SS in a manner which forms no part of the present invention.

Switch SS then steps to position 30 in which 600 cycle current is sent via *ssm7*, *ssm8*, *fcm1*, FCL to operate T, Fig. 11, once again. Earth via *tl*, *tsl*, *ks3* operates LS which short-circuits TT. TT releases and in turn releases DT, TS, KS, LS, JSA and circuit JSC is released.

In ICC, STR is short-circuited via *ssm0*, *ssm9* and releases slowly, releasing relays GS, LS, (MS, NS, or OS) JF, SSR.

Opening of contacts *gs4*, *gs5* releases T so that a circuit is formed for SSM via interrupter, *hs1*, *str2*, *tl*. SS steps home, in which position T again energises via *hs2*, *ssm8*, *ssm7* to stop SS. HS is now short-circuited via *str5*, *tl* and releases, followed by T and the identification circuit is released for use in other connections.

Fig. 14 shows schematically an interexchange connection and the calling party identification equipment therefor. The exchange equipment shown includes first and second line finders ILF, 2LF, and first group selectors used for local connections and outgoing connections, and selectors 2GS, 3GS, FS used for local connections only. On an outgoing connection LGS gives access to a junction J having an outgoing junction circuit OJC.

For calling party identification for automatic ticketing purposes a relay Str in OJC is operated and sends a start signal via lead S to operate relay St in the identification circuit IC. Str also connects 1500 cycle current to the third wire of the connection back to the calling party's individual line.

The final selectors FS have ten levels of 20 outlets and the third wires of each group of twenty subscribers' lines connected to the same final selector level are connected to condensers C which are multipled together and to a test contact of identification switch IM. IM has one hundred positions and five test wipers and the ten condenser groups of the subscriber groups connected to a final selector are connected to the five test contacts of two adjacent positions of the switch IM.

When relay St in IC operates, IM hunts for a test contact carrying 1500 cycle current and stops thereon. The last two final selectors of each group are used for calling party identification as well as conversational purposes and IF selects a final selector determined by the setting of IM. The trip spindle of FS then selects a wiper group determined by the position of IM and then hunts for 1500 cycle current in the selected level.

During the setting of the trip spindle and the wiper carriage of FS, tens and units digit switches in IC are set. The circuit is seized from the outgoing junction circuit which energises St. Earth via *oh4*, *lf1*, wipers *uma*, *tma*, *dma*, *al5*, *st1*, *lf5* operates Op which in turn energises slow-release relay Mf via *op1*, and Oc via *op2*. Contacts *oc2* energise Fc which connect potential to the valves DV1 ... 5.

Relay Vo operates to *oc2*, and earth via *vo3*, *ts3* operates Bc which connects the grid transformers DT1 ... DT5 of five valves DV1 ... DV5 to five wipers *a* ... *e* of IM.

Magnet IMM of finder IM is energised via *ao4*, *tb4*, *vo5*, and back contacts of anode-circuit relays A5 ... A1 of the valves DV5 ... DV1 in series.

Bc also opens the circuit of Mf which releases slowly and on release closes a circuit for magnet IFM of finder IF via *mf1*, *ft1*, *vo4*. IF chases IM.

When IM reaches the identification tone on one of its five wipers *a* ... *e*, the alternating current in the windings of the corresponding valve transformer causes its valve to become conductive so that the corresponding A relay operates opening the circuit of IMM.

The operation of any one A relay operates Ar which connects earth via *op1*, *bc4*, *ar1* to slow-to-operate relay Ao. During the operation of Ao, Mb is connected via *ts4*, *ao2*, *tb1*, *op5* to wiper *g* of IM to test if the position is already occupied by another circuit.

When Ao operates, direct current double-test relays Mt, Dt, operate in turn via *ao2*, *tb1*, *op5* to wiper *g* of IM. If two or more switches IM stop on a position simultaneously, only one set of Mt, Dt, relays will fully operate and the remaining IM switches will step on in well-known manner, due to the operation of Mb which completes a circuit for IMM.

When Mt, Dt have energised, Oh operates and when IF reaches a position connected to a final selector to which the marked line is multipled, test relay Ft energises; earth, wiper *g* of IF, wiper *h* of IM, *oh6*, windings of Ft, *cw1*, wiper *b* of IF to test battery via wire 3 from the final selector. Double test relay Df energises; earth, *vo4*, *ft1*, Df, Ft to the final test battery.

Switch C steps; CM, interrupter, *ic6*, *oh1*, *ss1*; looking for the outgoing junction circuit of the connection. When found Ss operates via *oh5*, *cmd*, *str1*, Fig. 1, Tpr, Tpr releases Str in the junction circuit to remove the start signal from lead S.

Relay Fp operates via *df1*, *fo1*, *dmc* locks via *fp2* and operates Dm via *fp4*, *dmb* and closes a fundamental circuit from the final selector via wiper *a* of IF, *fp1*, *fo4*, Os, to *tb3*. X is operated via TM interrupter, *oc3*, *tb5*, *os1*, *fp3*, while TM energises via *ts5*, *os1*, *fp3* and releases X.

The final selector trip spindle rotates and sends revertive impulses to Os which steps switch T.

Relay Ob has been operated via wiper *f* of IM if the latter is standing on a position corresponding to levels 1 ... 5 of the final selector. Relay Fo therefore tests via *tmb*, wires D for the operated relay either in the first five or second five contacts of switch T. Operation of Fo releases Fp at *fo1* opening the fundamental circuit to stop the trip spindle. Release of Os stops switch T which has been set to a position corresponding to the tens digit of the calling party's number is indicated by the position of IM.

Relay Fo operates Ts and Tb, which lock via ts3, vo3. Magnet DM operates via dm1, fp4, dmb, and relay Dm which is released slowly by Fo in turn releases DM to step switch D to position 2. Ts releases Bc so that Mf reenergises via bc4, op1. The transformers DF1—DF5 are disconnected from wipers a . . . e of IM. The operated A relay releases followed by Fo, Ar and Ao is released by Bc. Switch D steps to position 4 via its interrupters and dmc. In position 4 earth via dmc, df1 reenergises Fp, while earth via oc2, dmd, operates Us which locks to oc2. Fp reoperates Os in the fundamental circuit and the final selector wiper carriage moves sending back revertive impulses. Magnet UM is stepped by the reverted impulses in a circuit via us4, ts5, os1, fp3.

Contacts ts6 connect earth via tmd and a lead C to the wiper a . . . e of IM and so to the multipled group of twenty condensers of the substation group, including the calling party to prevent voice frequency identification current passing from one subscriber's line to another. When the final selector reaches the calling line the identification current passes via lead 4, wiper c of IF, cc3, us5, bc1 to transformer DT1, so that valve DV1 operates relay AL. Relays Ao and Fo energise to release Fp to open the fundamental circuit and stop the final selector. Switch U is now standing on a position characteristic of the calling party's units digit.

The subscriber's number is sent back in known manner under control of the marker switches and the final selector used for identification is released together with the identification circuit. These operations are not described in detail as they follow normal practice and form no part of the invention.

What is claimed is:

1. A telecommunication exchange system comprising a plurality of hunting switch mechanisms having a plurality of marking terminals, a group of marking conductors individually connected to said marking terminals, a common conductor, commoning connections joining all of the marking wires of said group to said common conductor, means for applying fluctuating marking currents to any of said marking conductors, first test means associated with said hunting switch mechanisms for ascertaining the presence of at least one component of said marking currents upon any one of said marking terminals for individually identifying a marking conductor, second test means for ascertaining the presence of at least one component of said marking currents upon said common conductor for a further control purpose, a plurality of segregating devices included in said commoning connections for passing at least one component of said marking alternating currents between any one of said marking conductors and said common conductor to operate said second test means while substantially preventing the passage of at least one component of said marking currents from one of said marking conductors to another of said marking conductors so as to prevent erroneous response of said first test means to currents upon an unmarked marking conductor.

2. A telecommunication exchange system comprising a plurality of hunting switch mechanisms having a plurality of marking terminals, a plurality of groups of marking conductors individually connected to said marking terminals, a plurality of common conductors one for each group of marking conductors, commoning connections joining all of the marking wires of each one of said groups to its corresponding common conductor, means for applying fluctuating marking currents to any of said marking conductors, first test means associated with said hunting switch mechanisms for ascertaining the presence of at least one component of said marking currents upon any one of said marking terminals for individually identifying a marking conductor, second test means for ascertaining the presence of at least one component of said marking currents upon any one of said common conductors for a further control purpose, a plurality of segregating devices included in said commoning connections for passing at least one component of said marking alternating currents between any one of said marking conductors and the corresponding common conductor to operate said second test means while substantially preventing the passage of at least one component of said marking currents from one of said marking conductors to another of said marking conductors so as to prevent erroneous response of said first test means to currents upon an unmarked marking conductor.

3. A system according to claim 1 wherein said means for applying fluctuating marking currents to any of said marking conductors comprise means for applying thereto alternating current of a first frequency and means for applying alternating current of a higher second frequency and wherein said segregating devices comprise series connected condensers of such value as to freely pass said second higher frequency while substantially attenuating said first frequency.

4. A system according to claim 1 wherein said segregating devices comprise rectifier means for passing current between each marking conductor and the corresponding common conductor while substantially preventing the passage of current between two marking conductors.

5. A telecommunication exchange system comprising a plurality of communication exchange switches having a plurality of terminals, a plurality of subscriber lines connected to said terminals, means for establishing a communication connection extending between any of said lines and another point over any of said switches, a further plurality of terminals connected to said communication exchange switches each of said further terminals being individually associated with one of said subscriber lines, means for placing marking potential on any one of said further terminals in response to the establishment of a communication connection over its associated line, subscriber identification equipment associated with said communication exchange switches for identifying lines engaged in a communication connection, said identification equipment comprising means for actuating one of said communication exchange switches to make contact with the further terminals associated with such an engaged line, and test means responsive to such marking potential on such further terminal.

6. A system according to claim 2 comprising a further plurality of hunting switch mechanisms having a plurality of marking terminals respectively connected to said plurality of common conductors, a starting lead for said further plurality of hunting switch mechanisms, further commoning connections joining all said common conductors to said starting lead, and further segregating devices included in said further commoning connections for passing at least one component of said marking currents from any of said common conductors to said starting lead while substantially blocking the passage of at least one component of said marking currents from one of said common conductors to another of said common conductors so as to prevent erroneous response of said second test means to currents upon an unmarked common conductor.

7. A system according to claim 1 wherein said segregating devices comprise means for passing alternating current of one frequency while attenuating alternating current of a second frequency and wherein said means for applying fluctuating marking currents to any of said marking conductors comprise means for applying thereto alternating currents of two different frequencies.

8. A system according to claim 2 wherein said segregating devices comprise means for passing alternating current of one frequency while attenuating alternating current of a second frequency and wherein said means for applying fluctuations marking currents to any of said marking conductors comprises means for applying thereto alternating currents of two different frequencies, said system further comprising a circuit having low impedance to alternating currents of said second frequency, and means for connecting said low impedance circuit between one of said common conductors and ground during the testing of the associated individual marking conductors by said first test means.

9. A system according to claim 1 further comprising a common return lead for said common conductor and wherein each of said segregating devices comprises four rectifiers forming a bridge two opposite corners of which are connected to the associated marking wire and to a point of fixed potential respectively, the other two corners of all said rectifier bridges being commoned to said common conductor and said common return lead the rectifiers being poled to pass current in one direction between any marking and its associated common conductor and between the common return lead and the point of constant potential while substantially blocking the passage of current in the opposite direction over the same paths.

10. A system according to claim 2 wherein each of said segregating devices comprise means for passing one frequency while attenuating alternating current of a second frequency and wherein said means for applying fluctuating marking current to any of said marking conductors comprises means for applying alternating currents of said two different frequencies to any of said marking conductors, said system further comprising a further plurality of hunting switch mechanisms having a plurality of marking terminals respectively connected to said plurality of common conductors, a starting lead for said further plurality of hunting switch mechanisms, further commoning connections joining all said common conductors to said starting lead, and further segregating devices included in said further commoning connections for passing pulsating current between each of said common conductors and the starting lead while substantially blocking the passage of pulsating current of the same frequency between any two of said common conductors.

11. A system according to claim 2 wherein each of said segregating devices comprise series connected condensers for passing one frequency while attenuating alternating current of a second substantially higher frequency and wherein said means for applying fluctuating marking current to any of said marking conductors comprises means for applying alternating currents of said two different frequencies to any of said marking conductors, said system further comprising a further plurality of hunting switch mechanisms having a plurality of marking terminals respectively connected to said plurality of common conductors, a starting lead for said further plurality of hunting switch mechanisms, further commoning connections joining all said common conductors to said starting lead, and further segregating devices included in said further commoning connections and each including rectifier means for passing pulsating current between each of said common conductors and the starting lead in one direction while substantially blocking the passage of currents over said same path in the other direction thereby substantially preventing the passage of pulsating current between any two of said common conductors.

12. A telecommunication exchange system comprising a plurality of subscribers' lines, means for establishing a communication connection between any of said lines and another point, a plurality of first hunting switch mechanisms having a plurality of individual marking terminals, a plurality of groups of individual marking conductors individually connected to said marking terminals and each associated with one of said lines, a plurality of common conductors one for each group of marking conductors, commoning connections joining all of the individual marking wires of each one of said groups to its corresponding common conductor, a further hunting switch mechanism having a plurality of group marking terminals respectively connected to said plurality of common conductors, means for applying alternating marking currents of two different frequencies to any of said individual marking conductors responsive to establishment of a common connection over its associated line, first test means associated with said first hunting switch mechanisms for ascertaining the presence of at least one component of said marking currents upon any one of said individual marking terminals for individually identifying a marking conductor, second test means associated with said further hunting switch mechanisms for ascertaining the presence of at least one component of said marking currents upon any one of said common conductors for identifying the group including a marking conductor, and a plurality of segregating devices included in said commoning connections for passing at least one component of said marking alternating currents between any one of said individual marking conductors and the corresponding common conductor to operate said second test means while substantially preventing the passage of at least one component of said marking currents from one of said individual marking conductors to another of said individual marking conductors so as to prevent erroneous response of said first test means to currents upon an unmarked marking conductor.

13. A telecommunication exchange system comprising a plurality of subscribers' lines, means for establishing a communication connection between any of said lines and another point, a plurality of first hunting switch mechanisms having a plurality of individual marking terminals, a plurality of groups of individual marking conductors individually connected to said marking terminals and each associated with one of said lines, a plurality of common conductors one for each group of marking conductors, first stage commoning connections joining all of the individual marking wires of each one of said groups to its corresponding common conductor, a further hunting switch mechanism having a plurality of group marking terminals respectively connected to said plurality of common conductors, a common starting lead for said further switch mechanism, second stage commoning connections joining all said common conductors to said starting lead, means for applying alternating marking currents of two different frequencies to any of said individual marking conductors responsive to establishment of a common connection over its associated line, first test means associated with said first hunting switch mechanisms for ascertaining the presence of at least one component of said marking currents upon any one of said individual marking terminals for individually identifying a marking conductor, second test means associated with said further hunting switch mechanism for ascertaining the presence of at least one component of said marking currents upon any one of said common conductors for identifying the group including a marking conductor, a plurality of first stage segregating devices included in said first stage commoning connections for passing at least one component of said marking alternating currents between any one of said individual marking conductors and the corresponding common conductor to operate said second test means while substantially preventing the passage of at least one component of said marking currents from one of said individual marking conductors to another of said individual marking conductors so as to prevent erroneous response of said first test means to currents upon an unmarked marking conductor, and a plurality of second stage segregating devices included in said second stage commoning connections for passing at least one component of said marking alternating currents between any one of said common conductors and said common starting lead while substantially preventing the passage of at least one component of said marking currents from one of said common conductors to another of said common conductors so as to prevent erroneous response of said second test means to currents upon a common conductor of an unmarked group.

14. A system according to claim 12 further comprising a distant exchange, a plurality of interexchange lines extending to said distant exchange, means for extending a connection from one of said subscribers' lines over one of said interexchange lines to said distant exchange, and means responsive to the identification of a marking conductor associated with one of said subscribers' lines for signaling the identity of such line to said distant exchange over an interexchange line separate from the one forming part of the communication connection.

15. A system according to claim 12 further comprising a distributing frame, said subscribers' lines being connected to said means for establishing a communication connection via said distributing frame and said individual marking conductors being connected to that set of the distributing frame adjacent said subscribers' lines.

16. A system according to claim 5 wherein said one of said communication exchange switches which is comprised in said identification equipment is a final selector switch.

17. A system according to claim 5 wherein said one of said communication exchange switches which is comprised in said identification equipment is a last choice switch with respect to establishment of communication connections.

18. A system according to claim 5 wherein said one of said communication exchange switches which is comprised in said identification equipment comprises means for transmitting impulses in synchronism with its hunting motion, said system further comprising tens and units register switches connected to the actuating response to said impulse or impulses.

19. A system according to claim 5 wherein the said one of said communication exchange switches which is comprised in said identification equipment is a P. B. X. final selector comprising circuits for causing P. B. X. hunting of such switch responsive to the stopping of such switch on a busy P. B. X. line during the establishment of the communication connection over said switch, said system further comprising a relay connected to open said circuits in response to actuation of such switch by said means for actuation.

20. A system according to claim 1 wherein said means for applying fluctuating marking currents to any of said marking conductors comprises means for applying thereto an alternating current of a single frequency only.

21. A system according to claim 1 further comprising means for connecting said common conductors to a point of fixed potential during operation of said first test means for individually identifying the marking conductor.

22. A telecommunication exchange system comprising subscriber lines, a plurality of hunting type switches each having terminals to which said subscriber lines are connected and a brush movable successively over said terminals, means for establishing a communication connection over any of said switches, and subscriber identification equipment for initiating the movement of the brush of one of said switches and for thereafter stopping the movement of said brush in contact with terminals of a line to be identified whereby connection is made to said line by the subscriber identification equipment of which said one of said switches therefore forms part.

23. A telecommunication exchange system comprising subscriber lines, switches having terminals to which said subscribers lines are connected, means for establishing a communication connection from any of said subscribers' lines over any of said switches, and subscriber-identification control means effective during the existence of a communication connection from one of said subscribers' lines over one of said switches for actuating an idle other one of said switches to make connection to said same one of said lines for determining the identity thereof.

LADISLAS KOZMA.